US010623292B2

(12) United States Patent
Shirasuka

(10) Patent No.: US 10,623,292 B2
(45) Date of Patent: Apr. 14, 2020

(54) RECEIVER AND EVENT-DETECTION-TIME-POINT ESTIMATION METHOD

(71) Applicant: MITSUBISHI ELECTRIC CORPORATION, Tokyo (JP)

(72) Inventor: Keiichi Shirasuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 45 days.

(21) Appl. No.: 15/776,719

(22) PCT Filed: Dec. 7, 2016

(86) PCT No.: PCT/JP2016/086309
§ 371 (c)(1),
(2) Date: May 16, 2018

(87) PCT Pub. No.: WO2017/154296
PCT Pub. Date: Sep. 14, 2017

(65) Prior Publication Data
US 2018/0351839 A1 Dec. 6, 2018

(30) Foreign Application Priority Data

Mar. 10, 2016 (JP) .................................. 2016-047148

(51) Int. Cl.
*H04L 12/26* (2006.01)
*H04L 12/24* (2006.01)
*H04L 12/28* (2006.01)

(52) U.S. Cl.
CPC ............ *H04L 43/087* (2013.01); *H04L 12/28* (2013.01); *H04L 41/0681* (2013.01); *H04L 43/16* (2013.01)

(58) Field of Classification Search
CPC ... H04L 43/087; H04L 41/0681; H04L 43/16; H04L 12/28
See application file for complete search history.

(56) References Cited

U.S. PATENT DOCUMENTS

2010/0250781 A1* 9/2010 Matsunaga ........... H04J 3/0685
709/248
2011/0043377 A1* 2/2011 McGrath ............ G08G 1/09675
340/905

(Continued)

FOREIGN PATENT DOCUMENTS

JP 2010-232845 A 10/2010
JP 2012-194759 A 10/2012

(Continued)

*Primary Examiner* — Shailendra Kumar
(74) *Attorney, Agent, or Firm* — Birch, Stewart, Kolasch & Birch, LLP

(57) ABSTRACT

A data reception unit as the receiver is a device for estimating an event detection time point and includes: a reception-time-point measurement unit that measures a reception time point when reception is made by a reception I/F unit; a reception-time-point expected value calculation unit that calculates a reception-time-point expected value which is an expected value of a next reception time point when detection data is subsequently received, from the reception time point and a sampling period; a jitter amount estimation unit that calculates a variation amount of the reception time point with respect to the reception-time-point expected value, as a system delay jitter amount; and an event-detection-time-point estimation unit that estimates an event detection time point, from a system delay time measured in advance, the reception-time-point expected value and the system delay jitter amount.

9 Claims, 12 Drawing Sheets

(56) References Cited

U.S. PATENT DOCUMENTS

| | | | |
|---|---|---|---|
| 2013/0282236 A1 | 10/2013 | Kato et al. | |
| 2015/0350099 A1* | 12/2015 | Sun | H04L 65/80 370/412 |
| 2015/0378356 A1* | 12/2015 | Hefeeda | G05B 19/0426 700/9 |

FOREIGN PATENT DOCUMENTS

| | | | |
|---|---|---|---|
| JP | 2012194759 A | * | 10/2012 |
| JP | 5702400 B2 | | 4/2015 |

* cited by examiner

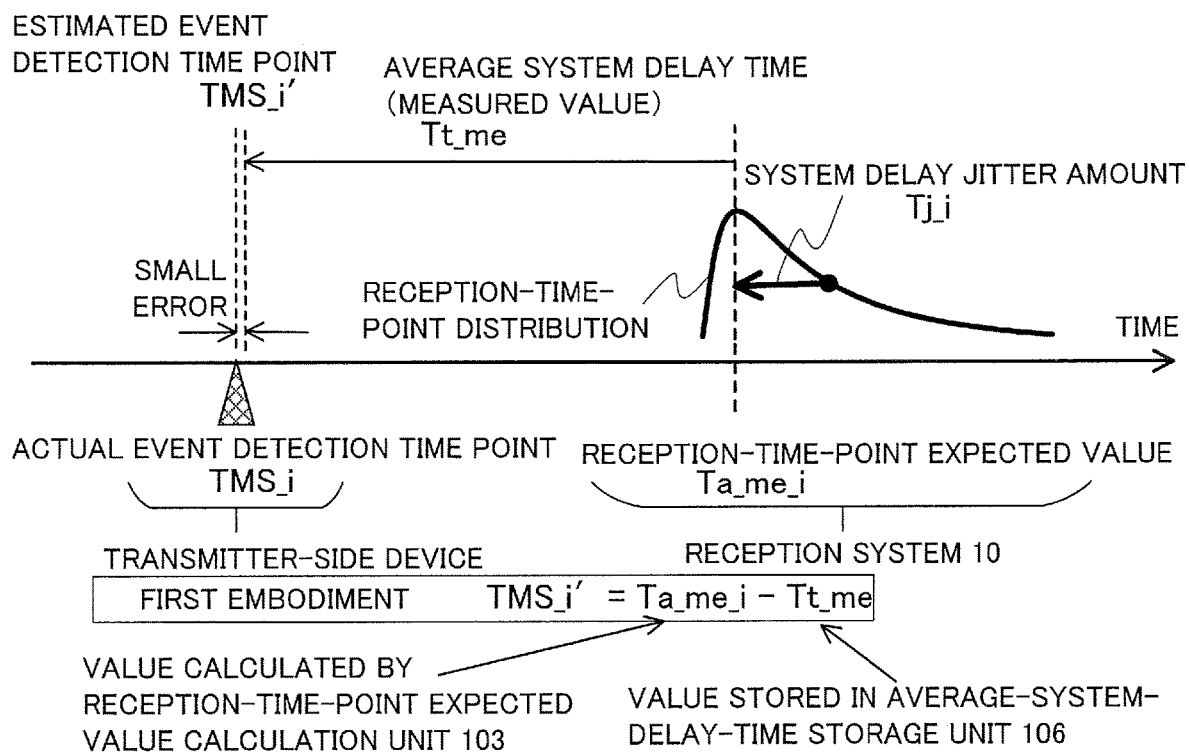
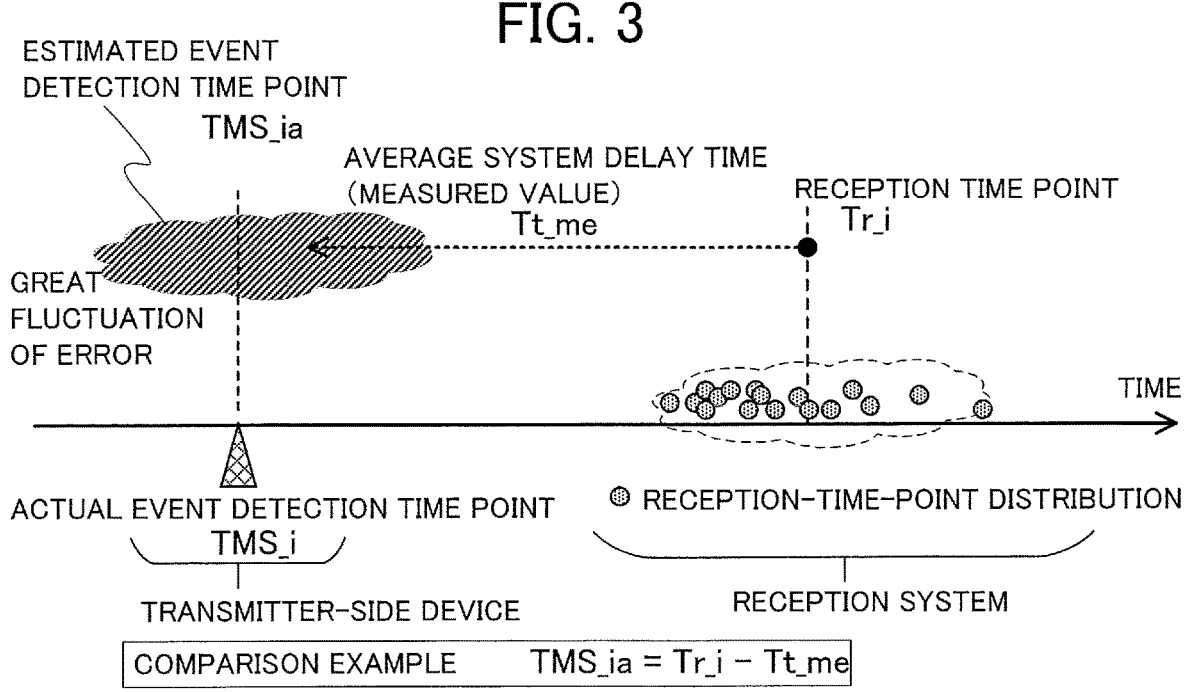

RECEIVER AND EVENT-DETECTION-TIME-POINT ESTIMATION METHOD

TECHNICAL FIELD

The present invention relates to a receiver for receiving data and a method of estimating an event detection time point.

BACKGROUND ART

If there is a long time interval (system delay time) from a time point (event detection time point) when a detector (sensor) provided on a road detects a situation (event) on the road to a time point (reception time point) when a receiver in a vehicle receives traffic guide information (detection data) based on the detection, there is the following problem: the received traffic guide information indicates old information (low reliable information). As a countermeasure against this problem, Patent Document 1 describes a device that acquires in advance an average value of the system delay time (average system delay time) in an information provision system, subtracts the average system delay time from the reception time point when the vehicle receives the traffic guide information, and thus estimates (calculates) the event detection time point. With the device, it is possible to remove, from the received traffic guide information, old information (low reliable information) detected at a time point (past time point) five minutes or more before the current time.

Patent Document 2 describes a vehicle-mounted device for identifying the same vehicle, by using travel information produced as a consequence of detecting an event by a detector (sensor) installed in a vehicle and information received by a communication terminal in this vehicle (travel information transmitted from another vehicle). In the vehicle-mounted device, the sensor, the communication terminal, a controller, the GPS (Global Positioning System) and a control ECU (Electronic Control Unit) for controlling an engine and a brake are connected with each other, through a bus of a CAN (Controller Area Network) which is an in-car network. Information indicating the result of the detection by the detector installed in the vehicle (own vehicle) is produced at intervals of 100 milliseconds. Information detected by the another vehicle is transmitted from a communication terminal (transmitter) in the another vehicle at intervals of several hundred milliseconds. If a time point indicated in time-point information added to the information received by the vehicle (own vehicle) is a time point (past time point) a threshold value or more before the current time, the received information is old information (low reliable information) and accordingly the information is removed.

PRIOR ART REFERENCE

Patent Reference

Patent Document 1: Japanese Patent Application Publication No. 2012-194759
Patent Document 2: Japanese Patent Publication No. 5702400

SUMMARY OF THE INVENTION

Problem to be Solved by the Invention

However, the device described in Patent Document 1 subtracts the average system delay time (an average value of the system delay time caused by data-generation-processing time and data transmission time) from the reception time point when the communication terminal (receiver) in the vehicle receives the traffic guide information, thereby estimating (calculating) the event detection time point which is a time point in the transmitter (transmitter-side time point). If the data-generation-processing time or the data transmission time greatly varies, the average system delay time greatly varies, and accordingly there is the following problem: an error of the estimated event detection time point with respect to a time point (actual event detection time point) when the detector actually detects the event greatly varies, and information which has not been removed may contain old information (low reliable information).

The device described in Patent Document 2 evaluates a time point when the information transmitted from the communication terminal (transmitter) in the another vehicle is received, but does not take the system delay time (delay time caused by the data-generation-processing time and the data transmission time) into consideration. For this reason, the process for estimating the event detection time point is not performed, and there is the following problem: information which has not been removed may contain old information (low reliable information).

The present invention has been made for solving the problems of the conventional art, and an object of the present invention is to provide a receiver capable of accurately estimating an event detection time point and an event detection-time-point estimation method used for accurately estimating the event detection time point.

Means for Solving the Problem

A receiver according to an aspect of the present invention is a receiver for receiving detection data sent from a sensor that detects an event in each fixed sampling period to estimate an event detection time point which is a time point when the sensor detects the event. The receiver includes: a reception unit to receive the detection data; a reception-time-point measurement unit to measure a reception time point which is a time point when the detection data is received by the reception unit; a reception-time-point expected value calculation unit to calculate a reception-time-point expected value which is an expected value of a next reception time point which is a time point when detection data is subsequently received, from the reception time point and the sampling period; a jitter amount estimation unit to calculate a variation amount of the reception time point with respect to the reception-time-point expected value, as a system delay jitter amount; and an event-detection-time-point estimation unit to estimate the event detection time point, from a system delay time measured in advance as a time period from the time point when the sensor detects the event to the reception time point, the reception-time-point expected value and the system delay jitter amount.

An event-detection-time-point estimation method according to another aspect of the present invention is a method of estimating, in a receiver for receiving detection data sent from a sensor that detects an event in each fixed sampling period, an event detection time point which is a time point when the sensor detects the event. The method includes: a step of measuring a reception time point which is a time point when the detection data is received by the receiver; a step of calculating a reception-time-point expected value which is an expected value of a next reception time point which is a time point when detection data is subsequently received, from the reception time point and the sampling period; a step of calculating a variation amount of the reception time point with respect to the reception-time-point expected value, as a system delay jitter amount; and a step of estimating the event detection time point, from a system delay time measured in advance as a time period from the time point when the sensor detects the event to the reception time point, the reception-time-point expected value and the system delay jitter amount.

Effects of the Invention

According to the present invention, it is possible to accurately estimate an event detection time point and therefore prevent occurrence of a situation in which old information (low reliable information) is not removed and a situation in which information which is not old is removed.

BRIEF DESCRIPTION OF THE DRAWINGS

FIG. 2 is a diagram showing an outline of a method of estimating an event detection time point by the receiver according to the first embodiment.

FIG. 3 is a diagram showing an outline of a method of estimating an event detection time point by a receiver in a comparison example.

MODE FOR CARRYING OUT THE INVENTION (1) First Embodiment (1-1) Configuration in First Embodiment (Transmitter-Side Device and Reception System 10)

Figure 1:
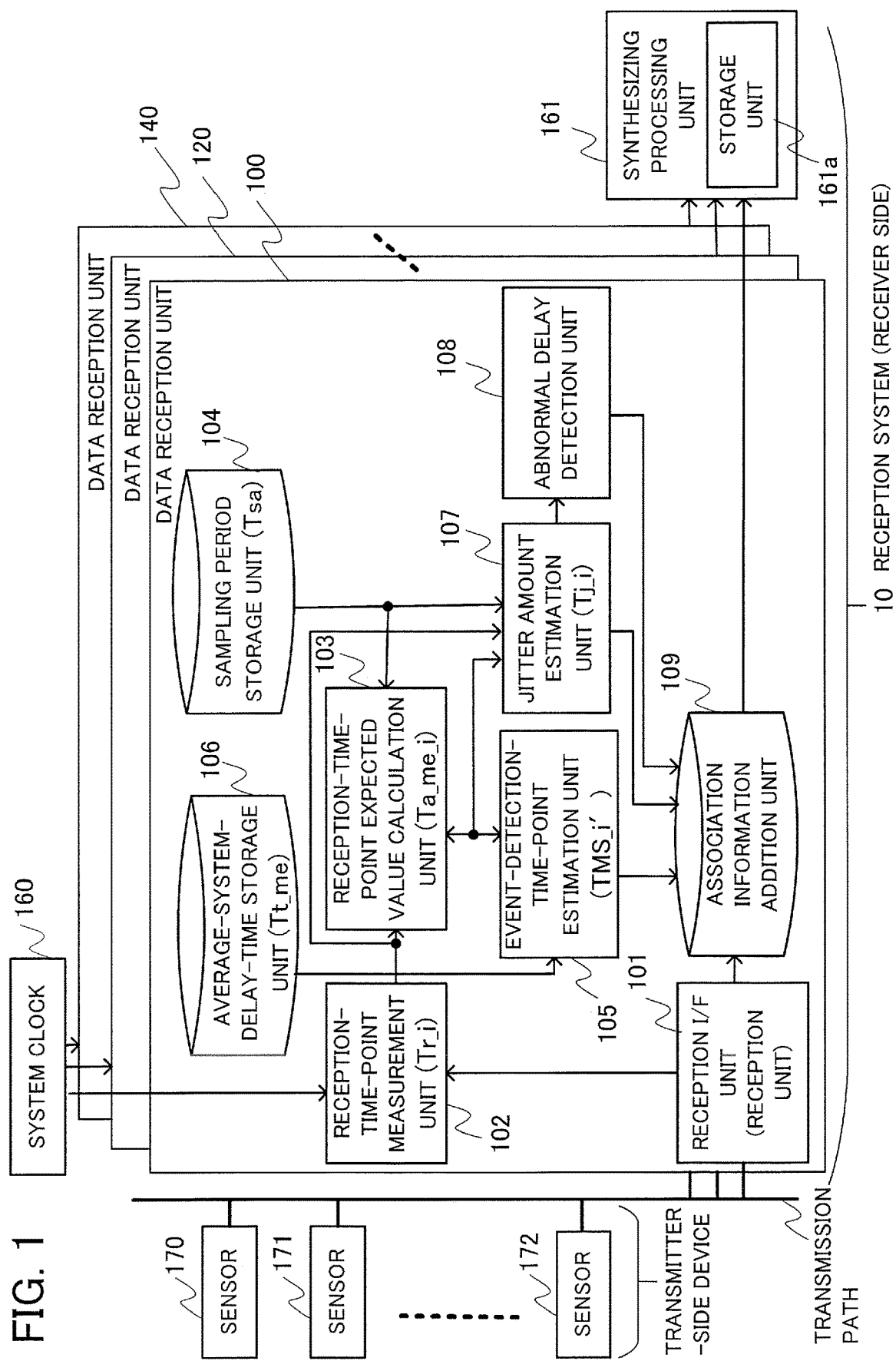
FIG. 1 is a block diagram schematically showing a configuration of a receiver according to a first embodiment of the present invention.

FIG. 1 is a block diagram schematically showing a configuration of a reception system 10 according to a first embodiment of the present invention. As shown in FIG. 1, a plurality of sensors (also referred to as 'sensor devices') 170, 171, ..., 172 for detecting events are communicably connected to a plurality of data reception units 100, 120, ..., 140 as a plurality of receivers for receiving a plurality of detection data (sensor data) respectively, through a transmission path.

Each of the sensors 170, 171 and 172 is a transmitter-side component (a transmitter-side device) for transmitting detection data as a detection result which is a product of event detection. Detection targets of the sensors 170, 171 and 172 are not limited. For example, each of the sensors 170, 171 and 172 is a position sensor for detecting a position of an object, a speed sensor for detecting a speed of an object, or the like. Although the three sensors 170, 171 and 172 are shown in FIG. 1, the number of the sensors may be one, two, or four or more.

As shown in FIG. 1, the plurality of data reception units 100, 120 and 140 and a synthesizing processing unit 161 form the reception system 10 as a receiver-side system for receiving detection data. Although the three data reception units 100, 120 and 140 are shown in FIG. 1, the number of the data reception units may be one, two, or four or more.

Each of the sensors 170, 171 and 172 performs sensing (event detection) in each fixed detection period (sampling period) Tsa, that is, at regular time intervals, processes a signal which is the product of the sensing, and sends, to a transmission path, a signal (detection data) which is the product of the processing. The transmission path is a signal transmission path for wireless communication or for wired communication. The transmission path can be formed by using a network such as the Internet or a LAN (Local Area Network), a bus, a telephone communication network, a dedicated line or the like, for example. The detection data sent from the sensors 170, 171 and 172 at regular intervals are input to the data reception units 100, 120 and 140 respectively, through the transmission path, for example. Each of the data reception units 100, 120 and 140 estimates (calculates) a time point when the corresponding sensor of the sensors 170, 171 and 172 installed in the transmitter-side device detects an event (event detection time point), makes the received detection data associated with the estimated event detection time point $TMS\_i'$, and then outputs the associated data to the synthesizing processing unit 161. Receiving the associated data from the data reception units 100, 120 and 140 (that is, receiving the plurality of data output from the plurality of data reception units), the synthesizing processing unit 161 performs a process of synthesizing the detection data on the basis of these data.

If the detection data sent from the sensors 170, 171 and 172 are position data concerning an object as a detection target, for example, the synthesizing processing unit 161 makes the position data (detection data) indicating positions of the same object detected by the sensors 170, 171 and 172 associated with estimation values TMS_i' (i=0, 1, 2, ... ) of time points (estimated event detection time points) when the sensors 170, 171 and 172 detect the object (detect the positions of the object), thereby making it possible to grasp (calculate) the position of the object at a time point different from the event detection time point TMS_i'. The synthesizing processing unit 161 may include a storage unit 161a for storing information (past data) containing the object position data (detection data) and the estimated event detection time points TMS_i' that are associated with each other. The storage unit 161a may be a part of the synthesizing processing unit 161 or may be a storage unit provided outside the synthesizing processing unit 161. By treating the position of the object detected by each of the sensors 170, 171 and 172 as a function of time, the synthesizing processing unit 161 can grasp (calculate) the position of the object at an arbitrary time point. Thus, the reception system 10 shown in FIG. 1 can grasp (calculate) the object position, such as a current position of the object as the detection target or a future position (prediction position) of the object as the detection target. Further, the synthesizing processing unit 161 can judge whether or not objects (detection targets) detected by the sensors 170, 171 and 172 are the same object. Furthermore, the synthesizing processing unit 161 makes efficient use of a plurality of position data included in a plurality of detection data sent from the sensors 170, 171 and 172, and therefore can improve the reliability of the detected object position data. In order to perform the synthesizing process with high accuracy, not only the object position data detected by the sensors 170, 171 and 172 but also accurate time-point information (event detection time points) on time points when the object is detected by the sensors 170, 171 and 172 are required. The following is a description of how the reception system 10 according to the first embodiment estimates the time point when the sensor detects the object, that is, the event detection time point TMS_i', with high accuracy.

(Data Reception Units 100, 120 and 140)

The data reception units 100, 120 and 140 are basically the same in configuration as each other. So, the configuration of the data reception unit 100 will be described below. The data reception unit 100 includes: a reception I/F (interface) unit 101 as a reception unit for receiving detection data sent from a sensor (e.g., the sensor 170); and a reception-time-point measurement unit 102 for measuring a time point (reception time point) when the detection data is received (i.e., acquiring the reception time point), by referring to a system time point from a system clock 160 every time when receiving from the reception I/F unit 101 a data reception notification of the reception of the detection data. The reception I/F unit 101 successively receives detection data. A reception time point when i-th (i is an integer not less than zero) received detection data is received is denoted as 'Tr_i'. The system clock 160 can be a clock for measuring a time point or a device for receiving a signal indicating a time point provided from outside (a time signal receiver), for example. FIG. 1 shows the system clock 160 as a component separate from the receivers, however, the system clock 160 may be a part of the receiver or may be a part of the synthesizing processing unit 161.

The data reception unit 100 further includes a reception-time-point expected value calculation unit 103. The reception-time-point expected value calculation unit 103 calculates an average system delay jitter amount that is a distribution mean value of variation time components (system delay jitter amount) Tj_i concerning system delay time that is a time period from a time point when the sensor for transmitting detection data detects an event (event detection time point) to a time point (reception time point) Tr_i when the reception I/F unit 101 receives the detection data. The average system delay jitter amount concerning i-th received detection data is denoted as 'Tj_me_i'. The sampling period that is a fixed detection interval between detections of the event by the sensor is denoted as 'Tsa'. The calculation of the average system delay jitter amount Tj_me_i is expressed by the following equations (1) and (2), where N is a predetermined sample number (positive integer) and K is an integer increased by 1 at each time sampling is performed (K=0, 1, 2, ... ).

$$\text{Tj\_me\_i} = \frac{1}{N} \sum_{i=K-N}^{K-1} \text{Tj\_i} \quad (1)$$

$$\text{Tj\_i} = \text{Tr\_i} - ((\text{Ta\_me\_i}-1) + Tsa) \quad (2)$$

However, when first detection data is received, as shown in steps S103 and S104 in FIG. 5 described later, the above equation (1) is replaced with Tj_me_i=Tr_0. When detection data is received until K reaches or exceeds the predetermined sample number N, equation (1) is replaced with the following equation (1'), as shown in step S107 in FIG. 5 described later.

$$\text{Tj\_me\_i} = \frac{1}{K} \sum_{i=0}^{K-1} \text{Tj\_i} \quad (1')$$

Next, the reception-time-point expected value calculation unit 103 calculates a new reception-time-point expected value (an expected value of a next reception time point when detection data is subsequently received) Ta_me_i, by adding the sampling period Tsa and the calculated average system delay jitter amount Tj_me_i to a reception-time-point expected value (Ta_me_i−1) which is calculated when immediately preceding detection data is received. This calculation is performed according to the following equation (3).

$$Ta\_me\_i = (Ta\_me\_i-1) + Tsa + Tj\_me\_i \quad (3)$$

The data reception unit 100 further includes an event-detection-time-point estimation unit 105 for estimating (calculating) an event detection time point TMS_i', by subtracting, from the reception-time-point expected value Ta_me_i, an average system delay time Tt_me calculated from measured values obtained by measuring the system delay time in advance. This calculation is performed according to the following equation (4).

$$TMS\_i' = Ta\_me\_i - Tt\_me \quad (4)$$

FIG. 2 is a diagram showing an outline of a method of estimating the event detection time point TMS_i' by the data reception unit 100 according to the first embodiment. The data reception unit 100 according to the first embodiment calculates the reception-time-point expected value Ta_me_i from the detection data received by the data reception unit 100 by using the above equations (1) to (3), subtracting the average system delay time Tt_me measured in advance from the reception-time-point expected value Ta_me_i as shown in the above equation (4), and thus estimates the event detection time point TMS_i' which is a time point when the sensor in the transmitter-side device detects the event. In this case, there is small fluctuation of error of the estimated event detection time point TMS_i' with respect to the actual event detection time point TMS_i.

FIG. 3 is a diagram showing an outline of a method of estimating an event detection time point TMS_ia by a receiver in a comparison example. In FIG. 3, 'Tt_me' represents an average value of the system delay time measured in advance (average system delay time) and 'Tr_i' represents a reception time point when detection data is received. In the comparison example, if the average system delay time is constant, the event detection time point TMS_ia at the sensor is calculated according to the following equation (5). In this case, there is greater fluctuation of error of the estimated event detection time point TMS_ia with respect to an actual event detection time point TMS_i, than that in the case of FIG. 2.

$$TMS\_ia = Tr\_i - Tt\_me \quad (5)$$

(1-2) Operation in First Embodiment

Figure 4:
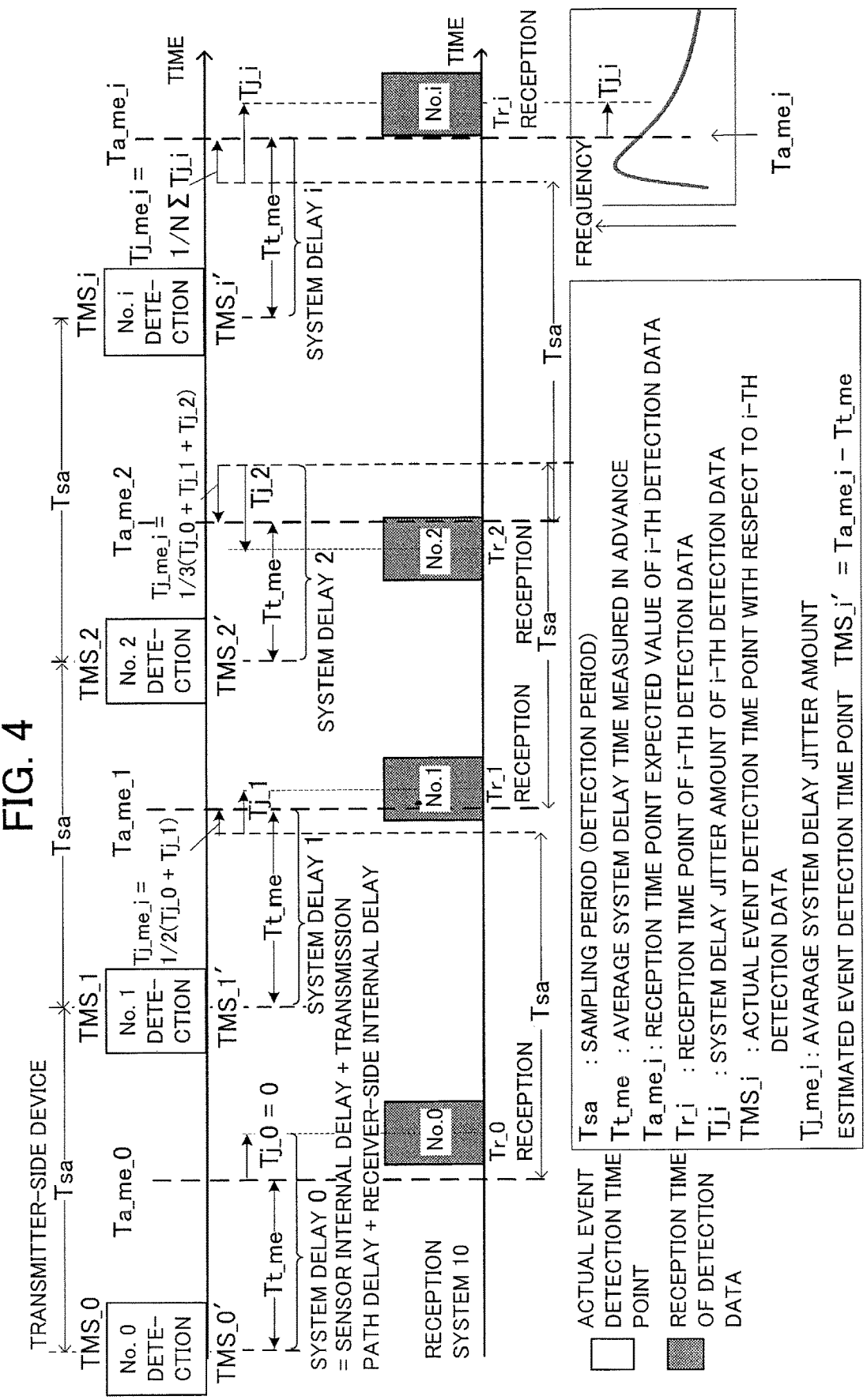
FIG. 4 is a timing chart showing the method of estimating an event detection time point by the receiver according to the first embodiment.

FIG. 4 is a timing chart showing the method of estimating the event detection time point by the data reception unit 100 according to the first embodiment. In FIG. 4, a time point (actual event detection time point) when the sensor 170 detects the object (performs sensing) is denoted as 'TMS_i' (i=0, 1, 2, . . . ). Detection data generated after a lapse of internal delay time taken for internal processing in the sensor 170 is denoted as 'No. i' (i=0, 1, 2, . . . ). The detection data sent from the transmitter-side device to the transmission path is received at a time point Tr_i (i=0, 1, 2, . . . ) by the data reception unit 100 in the reception system 10, after a lapse of transmission delay time. In the data reception unit 100, the reception I/F unit 101 performs a reception process. Specifically, in the data reception unit 100, data stored in a reception buffer in the reception I/F unit 101 is read out through a reception interruption process, the data is transferred to an association information addition unit 109, and then stored in the association information addition unit 109. In parallel with this, the reception I/F unit 101 sends, to the reception-time-point measurement unit 102, a data reception notification for notifying of the data reception. The event detection time point TMS_i' estimated by the event-detection-time-point estimation unit 105 is made to be associated with the detection data stored in the association information addition unit 109 and thus stored in the association information addition unit 109.

The sensor detects an event at regular detection intervals (sampling period) of Tsa and successively sends detection data. If the average system delay time Tt_me is constant, each reception interval between receptions of the detection data by the data reception unit 100 is an interval equal to the sampling period Tsa. However, most of internal processing in the transmitter-side device equipped with the sensor 170 or internal processing in the data reception unit 100 is executed by using software, hence time (delay time) taken for the internal processing varies (fluctuates). In a case that multiple transmitter-side devices are connected to the same transmission path (e.g., a case of a CAN bus or the like), if timing of transmission from a lower-priority device of the transmitter-side devices coincides with timing of transmission from a higher-priority device of the transmitter-side devices, transmission of detection data from the lower-priority transmitter-side device should be waited until transmission processing by the higher-priority transmitter-side device is completed. In such a case that multiple transmitter-side devices are connected to the same transmission path, transmission delay time generally varies (fluctuates). Accordingly, actual intervals between reception time points Tr_0, Tr_1, Tr_2, . . . , Tr_i when the reception is performed by the data reception unit 100 do not have the fixed value but have different values, as shown in FIG. 4.

In FIG. 4, 'Tt_me' denotes an average value of the system delay time measured in advance (average system delay time). If the average system delay time Tt_me is constant, it is possible to accurately calculate the event detection time point TMS_ia in the sensor 170 according to the above equation (5) (the estimation method of the comparison example). However, since the actual average system delay time Tt_me fluctuates, the estimated event detection time point TMS_ia calculated according to equation (5) (the estimation method of the comparison example) greatly fluctuates.

Thus, under circumstances where the average system delay time Tt_me varies, the data reception unit 100 according to the first embodiment estimates the event detection time point TMS_i' in the sensor 170 by using the reception-time-point expected value. In the first embodiment, the reception I/F unit 101 receives detection data and then outputs a data reception notification to the reception-time-point measurement unit 102. Every time when receiving the data reception notification, the reception-time-point measurement unit 102 acquires a current time point from the system clock 160 and notifies the reception-time-point expected value calculation unit 103 of the acquired current time point as the reception time point Tr_i.

Meanwhile, the system delay time is measured multiple times in advance, an average value (average system delay time) Tt_me of multiple values of the system delay time measured in advance is calculated, and the average system delay time Tt_me is stored in an average-system-delay-time storage unit 106.

(Sampling Period Storage Unit 104)

A sampling period storage unit 104 stores in advance the detection period (sampling period) Tsa in which the sensor 170 detects an event (e.g., detects an object).

(Reception-Time-Point Expected Value Calculation Unit 103)

The reception-time-point expected value calculation unit 103 calculates a reception-time-point expected value Ta_me_i according to the above equation (3), from an average value (average system delay jitter amount) Tj_me_i of a variation amount (system delay jitter amount) of an arrival time point Tj_i with respect to the fixed detection period (sampling period) Tsa, as shown in FIG. 4. The reception-time-point expected value Ta_me_i is calculated from N past reception time points and the sampling period Tsa. Specifically, the reception-time-point expected value Ta_me_i is obtained, by acquiring N system delay jitter amounts Tj_i as a deviation (system delay jitter amount) from the reception-time-point expected value when data is received, calculating the average system delay jitter amount Tj_me_i which is a moving average value of the N system delay jitter amounts according to the above equation (1), and adding the average system delay jitter amount Tj_me_i to ((Ta_me_i−1)+Tsa) as shown in the above equation (3). The event detection time point TMS_i' estimated in the first embodiment is calculated according to the above equation (4).

Figure 5:
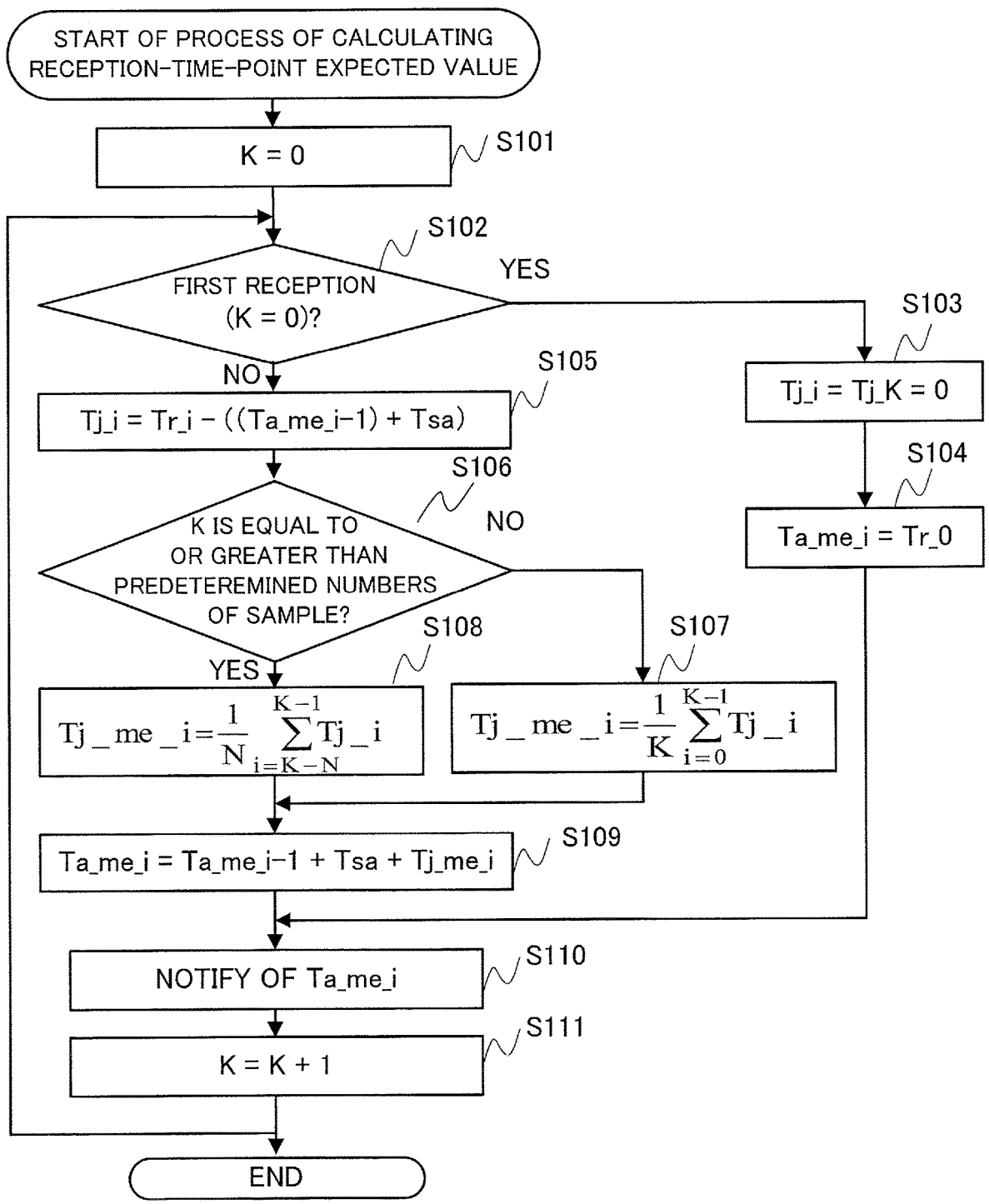
FIG. 5 is a flowchart showing a process of calculating a reception-time-point expected value by a reception-time-point expected value calculation unit in the receiver according to the first embodiment and in a receiver according to a second embodiment.

FIG. 5 is a flowchart showing a process of calculating the reception-time-point expected value Ta_me_i by the reception-time-point expected value calculation unit 103 in the data reception unit 100 according to the first embodiment. First, in step S101, K (K=0, 1, 2, . . . ) is set to an initial value of 0, and then, in step S102, the reception-time-point expected value calculation unit 103 judges whether or not it is the first reception of detection data after activation of the data reception unit 100. If it is the first reception (YES in step S102), the process proceeds to step S103 and a process of setting the system delay jitter amount Tj_i=Tj_K to a value of 0 (initialization) is performed. In other words, the reception-time-point expected value calculation unit 103 sets as Tj_i=0 on the assumption that the first received detection data includes no system delay jitter amount, sets the reception-time-point expected value Ta_me_i as the first reception time Tr_0 in step S104, and then advances the process to step S110. In the next step S110, the reception-time-point expected value calculation unit 103 notifies the event-detection-time-point estimation unit 105 and a jitter amount estimation unit 107 of the reception-time-point expected value Ta_me_i, increases K by 1, and then returns the process to step S102.

If it is judged in step S102 that the reception is not the first reception (NO in step S102), the reception-time-point expected value calculation unit 103 calculates the system delay jitter amount Tj_i in step S105 by using the above equation (2) and then advances the process to step S106. In this process, as shown in the above equation (2), a moving average of past system delay jitter amounts Tj_i is calculated. In the next step S106, the reception-time-point expected value calculation unit 103 judges whether or not N data necessary for a predetermined moving average process have been already received. If the number of detection data has not yet reached the necessary number of data (if K is smaller than the predetermined sample number N in step S106), it is judged as NO and the process proceeds to step S107. In step S107, the average system delay jitter amount Tj_me_i is calculated according to the above equation (1'). Then, in step S109, the reception-time-point expected value Ta_me_i, is calculated according to the above equation (3). In the next step S110, the reception-time-point expected value calculation unit 103 notifies the event-detection-time-point estimation unit 105 and the jitter amount estimation unit 107 of the reception-time-point expected value Ta_me_i, increases K by 1, and then returns the process to step S102.

If the number of detection data K reaches or exceeds the predetermined sample number N, it is judged as YES in step S106, the process proceeds to step S108. In step S108, the average system delay jitter amount Tj_me_i is calculated by using the above equation (1). In step S109, the reception-time-point expected value Ta_me_i is calculated according to the above equation (3). Next, in step S110, the reception-time-point expected value calculation unit 103 notifies the event-detection-time-point estimation unit 105 and the jitter amount estimation unit 107 of the reception-time-point expected value Ta_me_i, increases K by 1, and then returns the process to step S102.

As described above, each time when receiving new detection data from the reception-time-point measurement unit 102, the reception-time-point expected value calculation unit 103 is notified of a time point of the reception and performs the process shown in FIG. 5.

(Event-Detection-Time-Point Estimation Unit 105)

Figure 6:
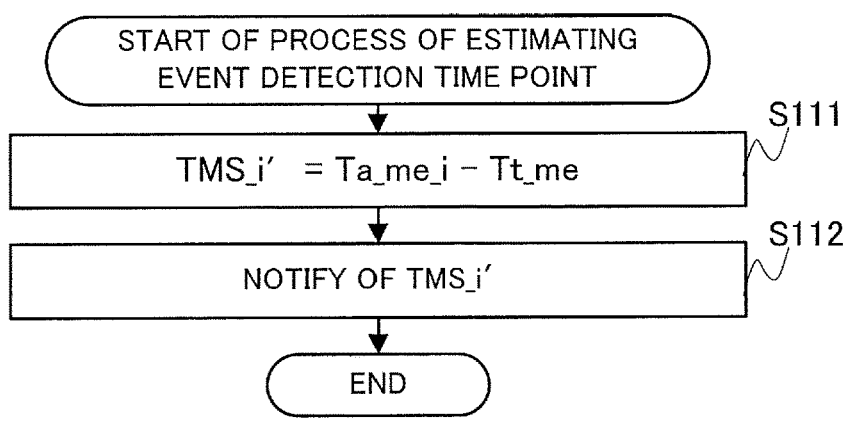
FIG. 6 is a flowchart showing a process of estimating an event detection time point by an event-detection-time-point estimation unit in the receiver according to the first embodiment.

FIG. 6 is a flowchart showing a process of estimating the event detection time point TMS_i' by the event-detection-time-point estimation unit 105 in the data reception unit 100 according to the first embodiment. The reception-time-point expected value calculation unit 103 notifies the event-detection-time-point estimation unit 105 of the reception-time-point expected value Ta_me_i, and then, in step S111, the event-detection-time-point estimation unit 105 estimates (calculates) the event detection time point TMS_i' by using the above equation (4). Then, in step S112, the event-detection-time-point estimation unit 105 notifies the association information addition unit 109 of the estimated event detection time point TMS_i' to make the association information addition unit 109 store the estimated event detection time point TMS_i'.

Receiving the estimated event detection time point TMS_i', the association information addition unit 109 makes the estimated event detection time point TMS_i' associated with the detection data from the sensor 170 which has been already supplied through the reception I/F unit 101 and temporarily stored in the association information addition unit 109, and then transmits the associated data to the synthesizing processing unit 161.

(Jitter Amount Estimation Unit 107)

Figure 7:
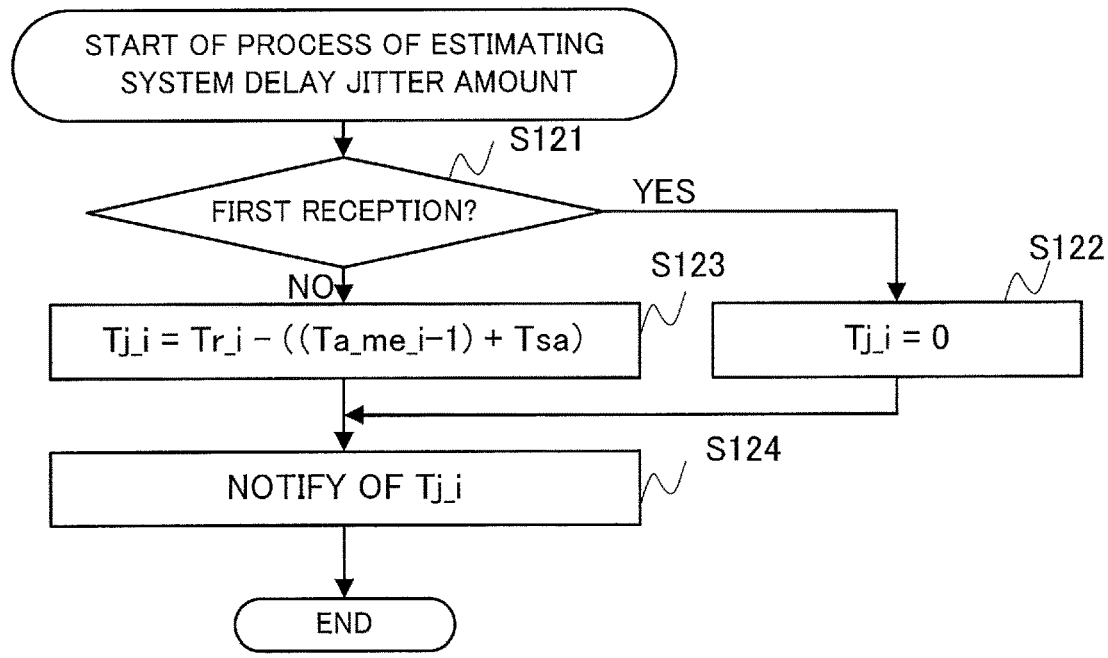
FIG. 7 is a flowchart showing a process of estimating a system delay jitter amount by a jitter amount estimation unit in the receiver according to the first embodiment.

FIG. 7 is a flowchart showing a process of estimating the system delay jitter amount Tj_i by the jitter amount estimation unit 107 in the data reception unit 100 according to the first embodiment. In step S121 in FIG. 7, the jitter amount estimation unit 107 judges whether or not it is the first reception of detection data after activation of the data reception unit 100. If it is the first reception, the system delay jitter amount Tj_i is initialized to zero in step S122. If it is not the first reception of the detection data in step S121, the jitter amount estimation unit 107 calculates the system delay jitter amount Tj_i in step S123 by using the above equation (2). Next, in step S124, the jitter amount estimation unit 107 notifies the association information addition unit 109 of the system delay jitter amount Tj_i.

(Abnormal Delay Detection Unit 108)

Figure 8:
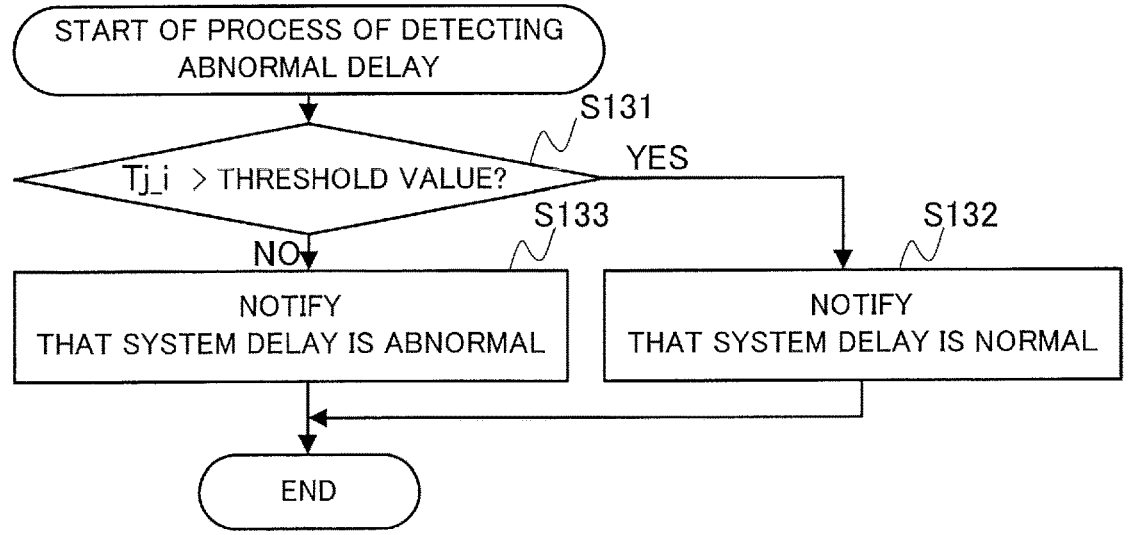
FIG. 8 is a flowchart showing a process of detecting an abnormal delay by an abnormal delay detection unit in the receiver according to the first embodiment and in the receiver according to the second embodiment.

FIG. 8 is a flowchart showing a process of detecting an abnormal delay by an abnormal delay detection unit 108 in the data reception unit 100 according to the first embodiment. By receiving the system delay jitter amount Tj_i from the jitter amount estimation unit 107 as an input, the abnormal delay detection unit 108 judges whether or not the estimated system delay jitter amount Tj_i is an abnormal delay amount. In step S131 in FIG. 8, the abnormal delay detection unit 108 judges whether or not the system delay jitter amount Tj_i is a delay exceeding a preset permissible amount (threshold value). If it is judged to be larger than the threshold value, the abnormal delay detection unit 108 notifies, in step S132, the association information addition unit 109 of abnormal delay flag information indicating that the system delay is abnormal. If the system delay jitter amount Tj_i is smaller than the threshold value in step S131, the abnormal delay detection unit 108 notifies, in step S133, the association information addition unit 109 of abnormal delay flag information indicating that the system delay is within a normal range.

(Association Information Addition Unit 109)

Receiving the notification from the jitter amount estimation unit 107, the association information addition unit 109 makes the system delay jitter amount Tj_i associated with the detection data from the reception I/F unit 101 and stores the associated system delay jitter amount Tj_i. Receiving the notification of the abnormal delay flag information from the abnormal delay detection unit 108, the association information addition unit 109 makes the abnormal delay flag information associated with the detection data from the reception I/F unit 101 and stores the associated abnormal delay flag information.

Thus, the detection data from the reception I/F unit 101 is associated with the event detection time point TMS_i', the system delay jitter amount Tj_i and the abnormal delay flag information, and the synthesizing processing unit 161 is notified of the detection data from the reception I/F unit 101 together with information on all these items or information on at least one of these items.

(1-3) Advantageous Effect of First Embodiment

Figure 9:
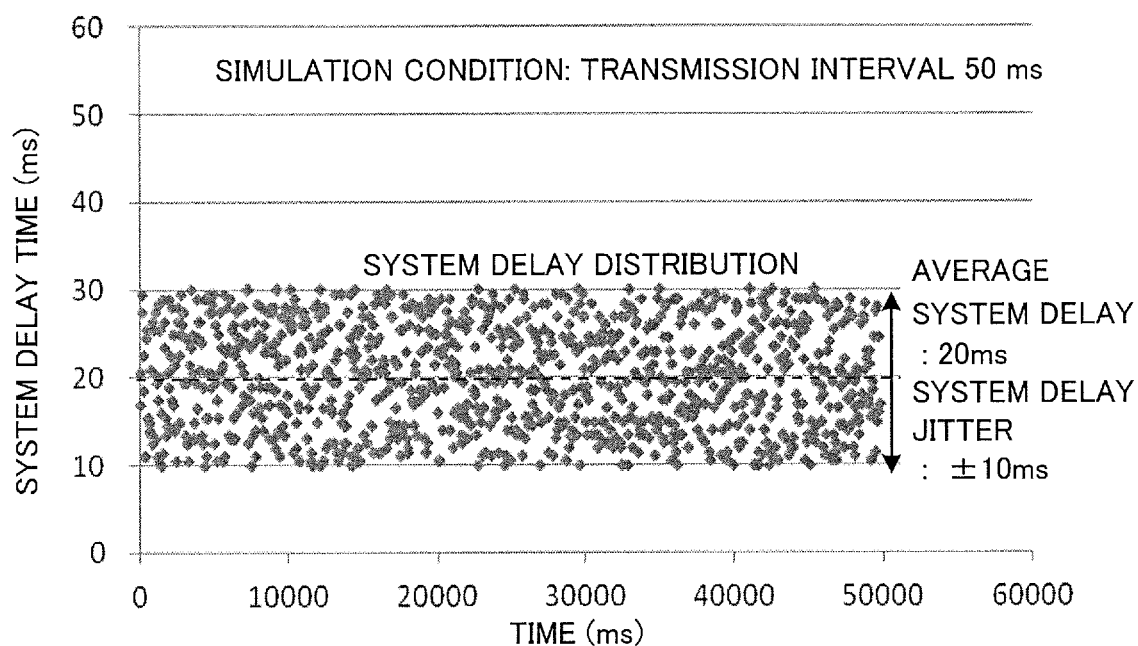
FIG. 9 is a diagram showing an example of a system delay distribution used for simulations in FIG. 10 and FIG. 11.
Figure 10:
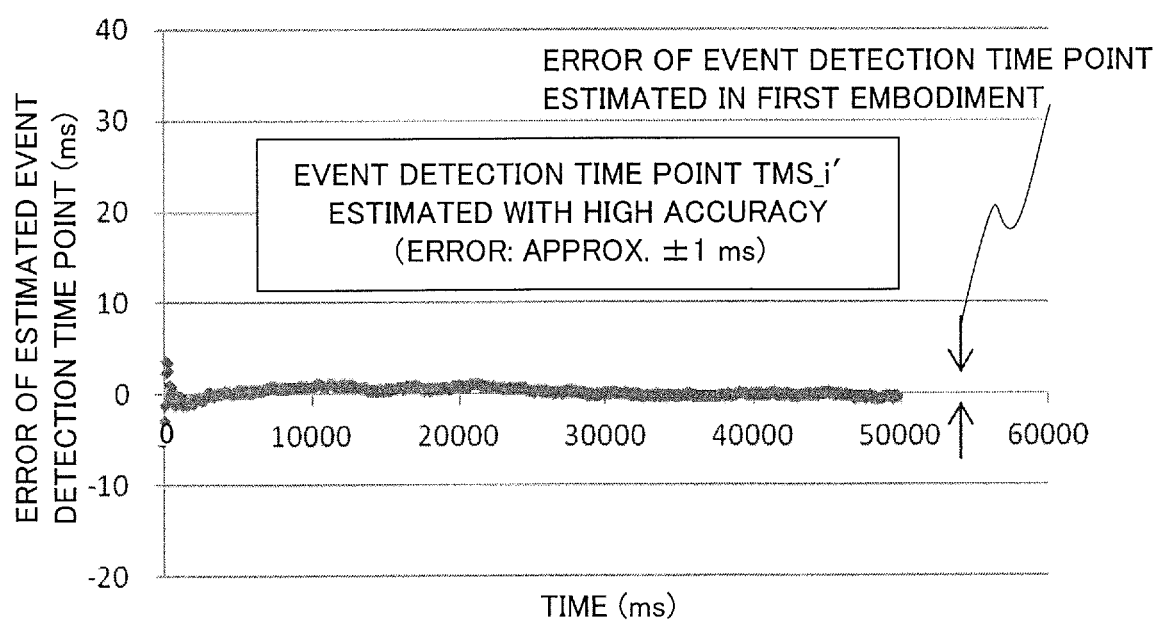
FIG. 10 is a diagram showing an example of estimation errors of event detection time points obtained through a simulation in the first embodiment.
Figure 11:
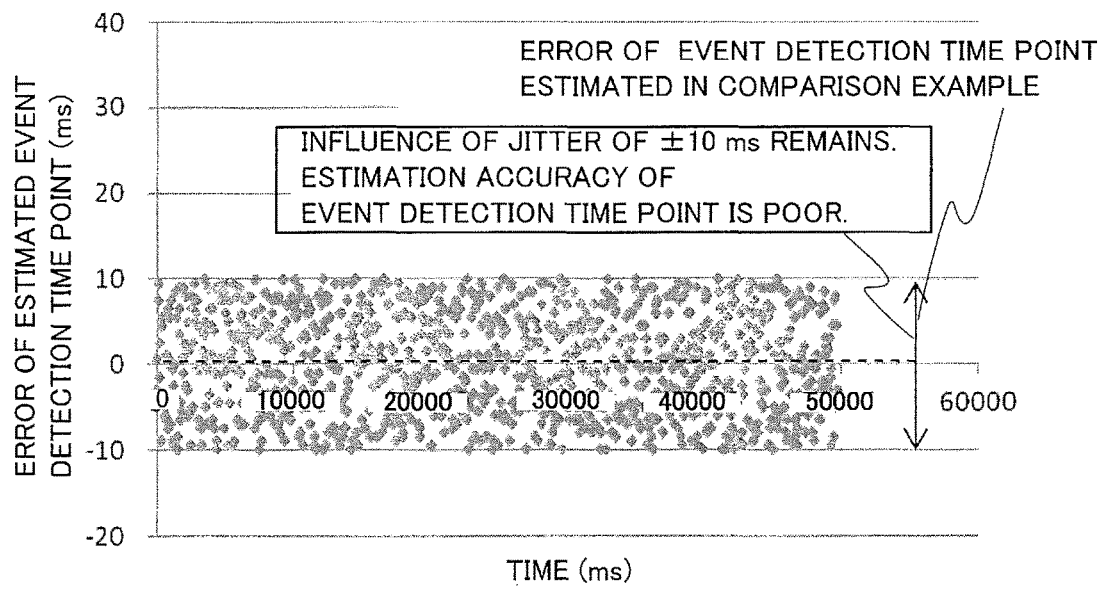
FIG. 11 is a diagram showing an example of estimation errors of event detection time points obtained through a simulation in the comparison example.

FIG. 9 is a diagram showing an example of a system delay distribution used for simulations in FIG. 10 and FIG. 11. FIG. 10 is a diagram showing an example of estimation errors of event detection time points obtained through the simulation in the first embodiment. FIG. 11 is a diagram showing an example of estimation errors of event detection time points obtained through the simulation in the comparison example.

FIG. 9 shows the system delay distribution. In the simulations in FIG. 9 to FIG. 11, the sampling period is 50 ms, the average system delay time is 20 ms and system delays are produced at random so that the system delay jitter amount is within a range of ±10 ms. FIG. 10 shows the result of the simulation of errors between estimated event detection time points TMS_i' estimated by the data reception unit 100 according to the first embodiment and actual event detection time points TMS_i, when such data is received by the data reception unit 100 according to the first embodiment.

FIG. 11 shows the result of the simulation of errors between event detection time points TMS_ia calculated in the comparison example, that is, according to the above equation (4) and actual event detection time points TMS_i. The result indicates that, in the comparison example shown in FIG. 11, fluctuation in the system delay jitter amount within a range of ±10 ms directly influences the estimated event detection time points (TMS_ia in the above equation (5)), the influence of the fluctuation within a range of ±10 ms remains in the estimated event detection time points TMS_ia, and therefore time point estimation accuracy is poor.

In contrast, according to the configuration in the first embodiment, fluctuation of the system delay jitter amount within a range of ±10 ms is removed from the estimated event detection time points TMS_i', as shown in FIG. 10, and it is possible to calculate an event detection time point which is estimated with high accuracy, even under circumstances where the system delay time contains jitter.

As shown in FIG. 10, according to the configuration in the first embodiment, in the system for transmitting data from the transmitter to the receiver, it is possible to estimate the event detection time point TMS_i' by the receiver with high accuracy, even under circumstances where the system delay time contains jitter.

It is possible to apply the configuration in the first embodiment to a system in which a plurality of various sensors (the sensors 170, 171 and 172 and the like in FIG. 1) are included, such as a camera installed in a vehicle, a millimeter wave radar, LIDAR (Light Detection and Ranging or Laser Imaging Detection and Ranging) and SONAR, for example, each of the sensors performs sensing (detection) in each fixed sampling period, raw data obtained through the sensing or data converted to information such as object position information, relative distance information and object type information is transmitted through an in-car network such as a CAN or a LAN (Local Area Network), and an ECU acquires these data and controls steering, a brake, an accelerator of an automobile. For example, in a case that sensor data captured by each of the sensors is information on a position of an object, it is possible to estimate with high accuracy a time point when each of the sensors detects an event, that is, a time point (event detection time point) when each of the sensors senses the object from the received object position information, to make received sensing data associated with the estimated event detection time point, and therefore to grasp accurately positions at time points of the sensing by the sensors. When the detection target object or the automobile is moving, it is possible to calculate a speed or acceleration of the object from latest several samples of object position data with estimated time points composed of estimated event detection time points and object positions at the time points, and it is possible to estimate the current position of the object from this and the current time point, with high accuracy.

For example, if 'X(t1)' denotes an object position vector on three-dimensional coordinates of an object detected by the sensor at an estimated event detection time point (estimated sensing time point) t1 and 'v(t)' denotes an object speed at a time point t, it is possible to calculate an object position coordinate vector X(t) at the current time point t according to the following equation (6) with high accuracy and it is possible to estimate the current position with high accuracy.

$$X(t)=\int_{t1}^{t} v(t)d(t)+X(t1) \quad (6)$$

This means that a system equipped with the receiver (the event-detection-time-point estimation method) according to the first embodiment is capable of estimating with high accuracy that the object position X(t1) captured by the sensor was a phenomenon at the time point t1. A case that vehicles travelling at a speed of 100 km/h pass by each other on a road will be considered, for example. When a sensor detects an object at intervals of 100 ms, the both vehicles approach each other approximately 2.8 m during a period of 100 ms. If the estimation method of the first embodiment is not used, an object position error of 2.8 m at maximum is contained until the next sample.

If a future object position is predicted according to equation (6) while the object position error is contained, influence of the error increases and the estimation error of the object position becomes greater, and the reliability of an obstacle avoidance route for the vehicles obtained by using the estimated vehicle positions may be consequently lowered, for example. According to the receiver (the event-detection-time-point estimation method) of the first embodiment, it is possible to estimate a time point when an object is at a certain position with high accuracy. Therefore, it is possible to calculate the position of the object as a function of time according to equation (6), to predict a future position of the object with high accuracy, and to accurately calculate a route which allows a vehicle to avoid an obstacle, as a vehicle travel route, for example.

Further, in the first embodiment, an association is established between a detected object position and a time point of the detection (event detection time point). Therefore, when a process of judging whether objects are the same object or different objects is performed by synthesizing data from a plurality of sensors, it is possible to estimate that objects captured by different sensors are the same object, with high accuracy.

In the first embodiment, the receiver is capable of estimating an event detection time point with high accuracy, without adding time-point information by the transmitter. Thus, a time-point addition function of the transmitter-side device is not necessary and a sensor can be selected more freely. For example, it is not usual for various sensors installed in an automobile to include a sensor with a time addition function of adding a time point of sensing. In a case that it is used for use of controlling steering, a brake and an accelerator by an ECU, through an in-car network such as a CAN according to object position information from these sensors, multiple sensors should be used. However, in such a system, it is difficult to use a sensor with the function of adding a time point of sensing. In the first embodiment, a sensor without the function of adding time point information to detection data can be used as the sensor.

Moreover, in the first embodiment, even if the multiple sensors do not have the function of adding a time point of sensing, the receiver is capable of estimating a time point of sensing with high accuracy, and therefore it is possible to reduce cost of the system using multiple sensors.

Furthermore, in the first embodiment, notification of the detection data is performed by making the detection data associated with the system delay jitter amount or notification of the detection data is performed by making the detection data associated with the abnormal delay flag information, and therefore it is possible to grasp, from the size of the delay jitter amount, abnormal increase in load on the system or traffic jam conditions on the transmission path and it is possible to evaluate the degree of stability of the system. Moreover, in the first embodiment, if the system delay amount is a great delay amount that exceeds a permissible level, it is judged that the reliability of the detection data is low and the use of the detection data can be accordingly prevented, and therefore it is possible to avoid abnormal operation.

(2) Second Embodiment (2-1) Configuration in Second Embodiment

The performance of the data reception units 100, 120 and 140 as the receivers according to the first embodiment may be influenced by a change in circumstances (for example, a function of limiting the number of times of retrying data transmission). This is because there are some systems provided with a function of limiting the number of times of data transmission from a transmitter-side device to a transmission path in order to prevent extreme increase in transmission load, and the function may cause the average system delay time Tt_me measured in advance to greatly vary. In contrast, in data reception units 200, 220 and 240 as receivers according to the second embodiment, a shortest system delay time Tt_min that is comparatively less influenced by a change in circumstances is used instead of the average system delay time Tt_me. Therefore, even in a case that the function of limiting the number of times of data transmission from a transmitter-side device to a transmission path works, it is possible to suppress variation in the performance of the data reception units 200, 220 and 240.

Figure 13:
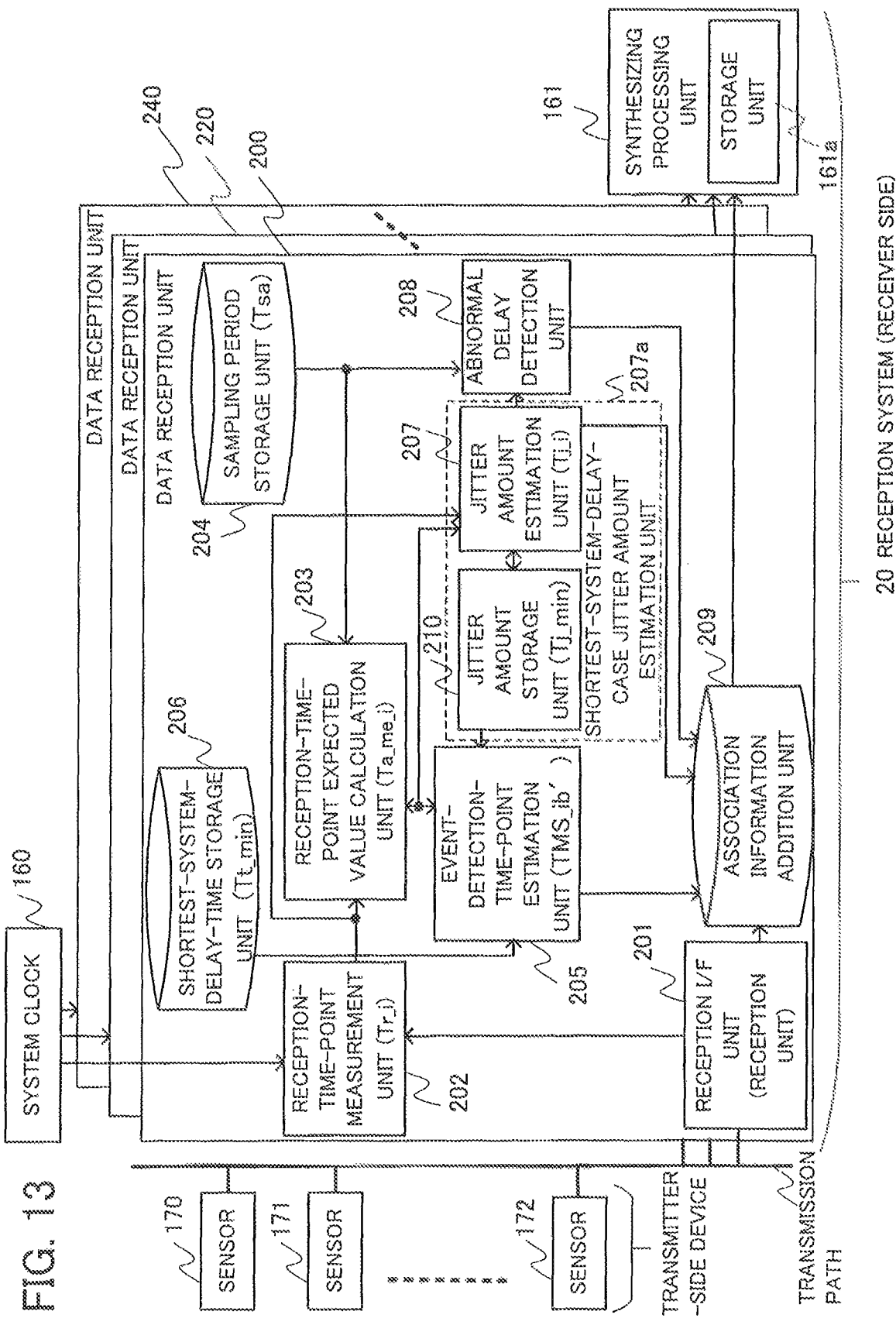
FIG. 13 is a block diagram schematically showing a configuration of the receiver according to the second embodiment.

FIG. 13 is a block diagram schematically showing a configuration of the data reception units 200, 220, . . . , 240 as the receivers according to the second embodiment of the present invention. In FIG. 13, components that are the same as or correspond to the components shown in FIG. 1 are assigned the same reference characters as the reference characters in FIG. 1. As shown in FIG. 13, the plurality of sensors 170, 171, . . . , 172 for detecting an event are communicably connected to the plurality of data reception units 200, 220 and 240 for receiving detection data (sensor data) through a transmission path.

As shown in FIG. 13, the plurality of data reception units 200, 220 and 240 and the synthesizing processing unit 161 form a reception system 20 as a receiver-side system for receiving detection data. Although FIG. 13 shows the three data reception units 200, 220 and 240, the number of the data reception units may be one, two, or four or more.

The data reception units 200, 220 and 240 are basically the same in configuration as each other. Accordingly, the configuration of the data reception unit 200 will be described below. The data reception unit 200 includes: a reception I/F unit 201 as a reception unit for receiving detection data sent from a sensor (e.g., the sensor 170); and a reception-time-point measurement unit 202 for measuring a time point (reception time point) when detection data is received (that is, for acquiring the reception time point) by referring to a system time point from the system clock 160, every time when receiving from the reception I/F unit 201 a data reception notification for notifying of reception of detection data. The reception I/F unit 201 successively receives detection data, and a reception time point when i-th (i is an integer not less than zero) received detection data is received is denoted as 'Tr_i'.

Figure 12:
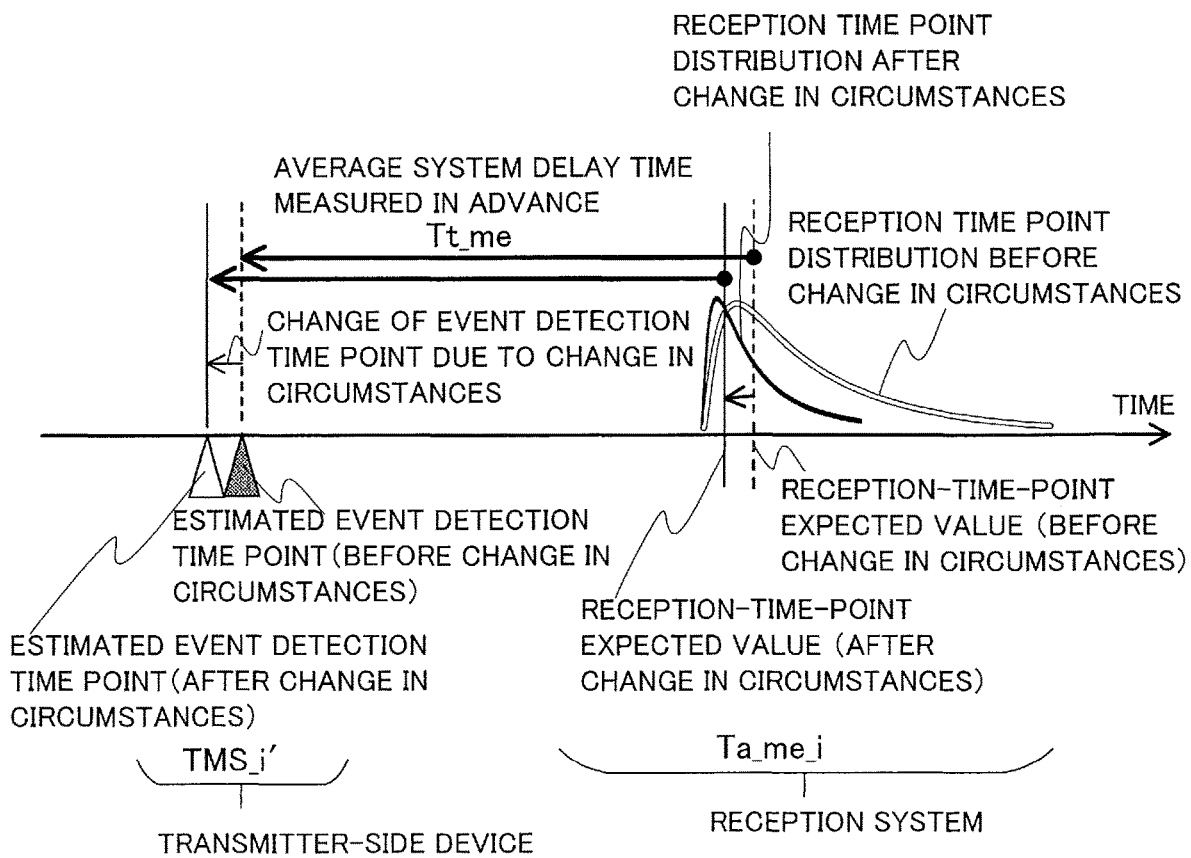
FIG. 12 is a diagram showing a problem of the method of estimating an event detection time point by the receiver according to the first embodiment.

In the first embodiment, as shown in the above equation (4), the event detection time point TMS_i' is calculated by subtracting the average system delay time Tt_me measured in advance from the reception-time-point expected value Ta_me_i. Here, if a CAN which is an in-car network is used as a transmission path for communicably connecting the sensor and the data reception unit, for example, there is a protocol which fixes an upper limit to the number of times of retrying, as a protocol for the CAN. If the number of times of retrying data transmission reaches the fixed upper limit number (e.g., 256) due to a trouble caused in the sensor connected to the CAN, this protocol limits data transmission from this transmitter-side device to the CAN, in order to prevent increase in transmission load caused by multiple times of retrying. When such a situation occurs, a data transfer amount on the CAN decreases, the frequency of bus contention between transmitter-side devices at the time of data transmission accordingly decreases, and thus the average system delay time Tt_me measured in advance is shortened. In other words, as shown in FIG. 12, the reception-time-point expected value Ta_me_i in the data reception unit shifts (shifts in the leftward direction), due to a change in circumstances, from a reception-time-point distribution curve (a white line) before the change in circumstances to a reception-time-point distribution curve (a black line) after the change in circumstances. Consequently, in the data reception unit according to the first embodiment, since the changed average system delay time Tt_me is subtracted from the leftward-shifted reception-time-point expected value Ta_me_i, the estimated event detection time point TMS_i' estimated in the first embodiment may greatly deviate from the actual event detection time point TMS_i.

To cope with this, each of the data reception units 200, 220 and 240 according to the second embodiment includes a shortest-system-delay-time storage unit 206 instead of the average-system-delay-time storage unit 106, and additionally includes a jitter amount storage unit 210 (a jitter amount estimation unit 207 and the jitter amount storage unit 210 constitute a shortest-system-delay-case jitter amount estimation unit 207a), as shown in FIG. 13. In these regards, the data reception units 200, 220 and 240 according to the second embodiment differ from the data reception units 100, 120 and 140 according to the first embodiment. The reception I/F unit 201, a reception-time-point measurement unit 202, a reception-time-point expected value calculation unit 203, a sampling period storage unit 204, an abnormal delay detection unit 208 and an association information addition unit 209 in the second embodiment are the same in function as the reception I/F unit 101, the reception-time-point measurement unit 102, the reception-time-point expected value calculation unit 103, the sampling period storage unit 104, the abnormal delay detection unit 108 and the association information addition unit 109 in the first embodiment respectively. Accordingly, equations (1), (1'), (2) and (3) in the first embodiment can be also applied in the second embodiment.

Figure 14:
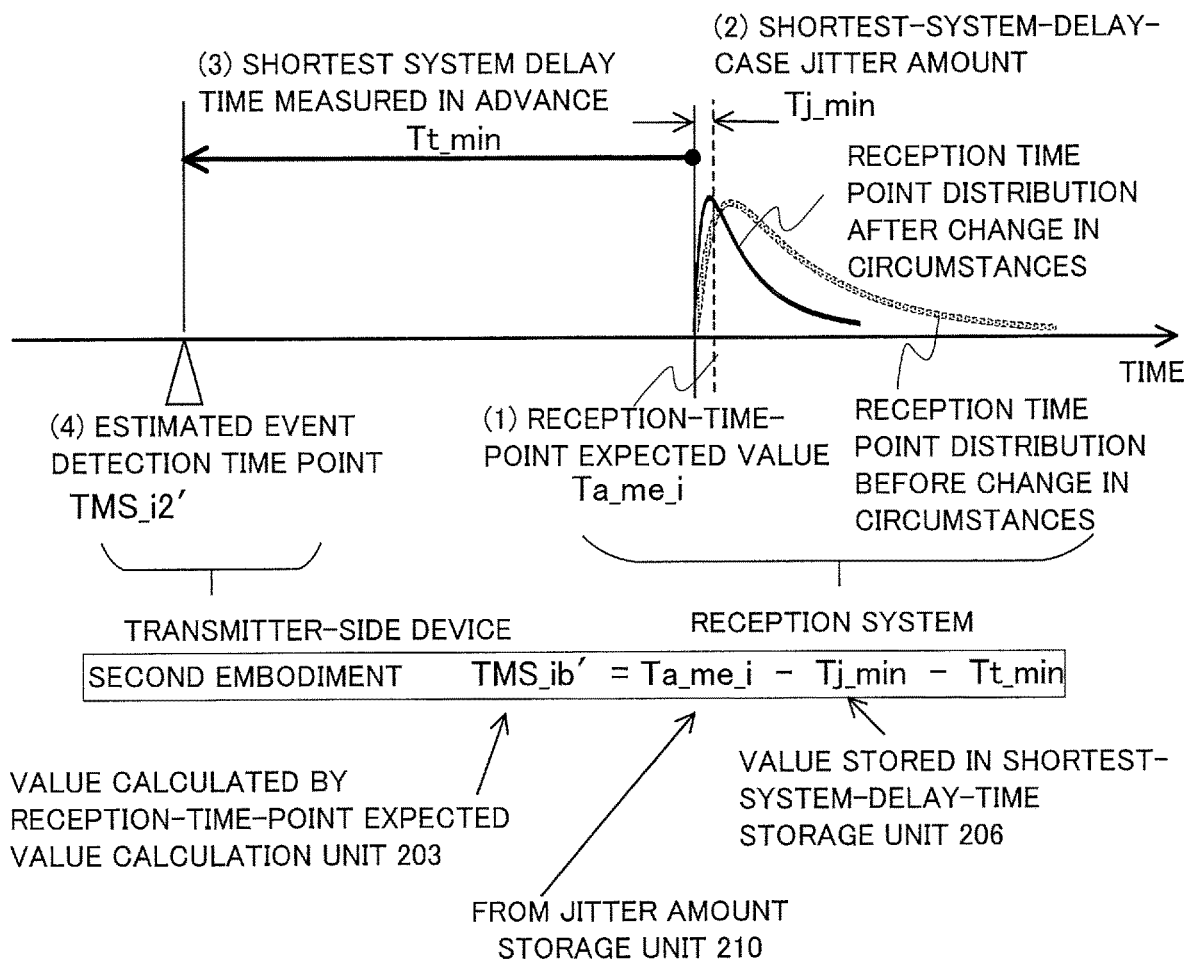
FIG. 14 is a diagram showing an outline of a method of estimating an event detection time point by the receiver according to the second embodiment.

In the second embodiment, a time point when the sensor in the transmitter-side device detects an event is estimated in the following manner. The reception unit 200 according to the second embodiment uses the following theory: the shortest system delay time Tt_min measured in advance is equivalent to a shortest system delay time during operation after the measurement in advance (that is, it can be regarded that both are substantially equivalent), and the shortest system delay time Tt_min does not change even if the average system delay time Ta_me_i changes due to a change in circumstances occurred during operation after the measurement in advance. A bandwidth usage amount under normal circumstances on a network as a transmission path is designed so as to be a sufficiently small amount in comparison with a maximum communication amount available on the network. Accordingly, the shortest time of the system delay time at the time of the measurement in advance and the shortest time of the system delay time after the measurement in advance are both shortest time periods in a case that data is successfully transmitted through the transmission path while no bus contention occurs, and these are considered to be the same time period (shortest system delay time) Tt_min. By defining a time obtained by subtracting, from the reception-time-point expected value Ta_me_i, a reception time point Tr_i when reception is made with the shortest system delay time, as a jitter amount (shortest-system-delay-case jitter amount) Tj_min when reception is made with the system delay time that is the shortest (when reception is made in the shortest time), the shortest-system-delay-case jitter amount Tj_min can be calculated in the following manner by the data reception unit 200 during operation. That is, in a case that detection data is received while the system delay time is shortest, since the jitter amount Tj_i calculated by the jitter amount estimation unit 207 is maximum, if the reception time point Tr_i is earlier than the reception-time-point expected value Ta_me_i and if the jitter amount Tj_i calculated by the jitter amount estimation unit 207 is greater than the past maximum value (if the jitter amount Tj_i is a new maximum value), the jitter amount Tj_i is stored in the jitter amount storage unit 210 as the shortest-system-delay-case jitter amount Tj_min. By using these values, an event detection time point TMS_ib' can be calculated by subtracting, from the reception-time-point expected value Ta_me_i, the shortest-system-delay-case jitter amount Tj_min and the shortest system delay time Tt_min measured in advance, as shown in FIG. 14. This calculation can be expressed by the following equation (7).

$$TMS\_ib' = Ta\_me\_i - Tj\_min - Tt\_min \quad (7)$$

(2-2) Operation in Second Embodiment

Figure 15:
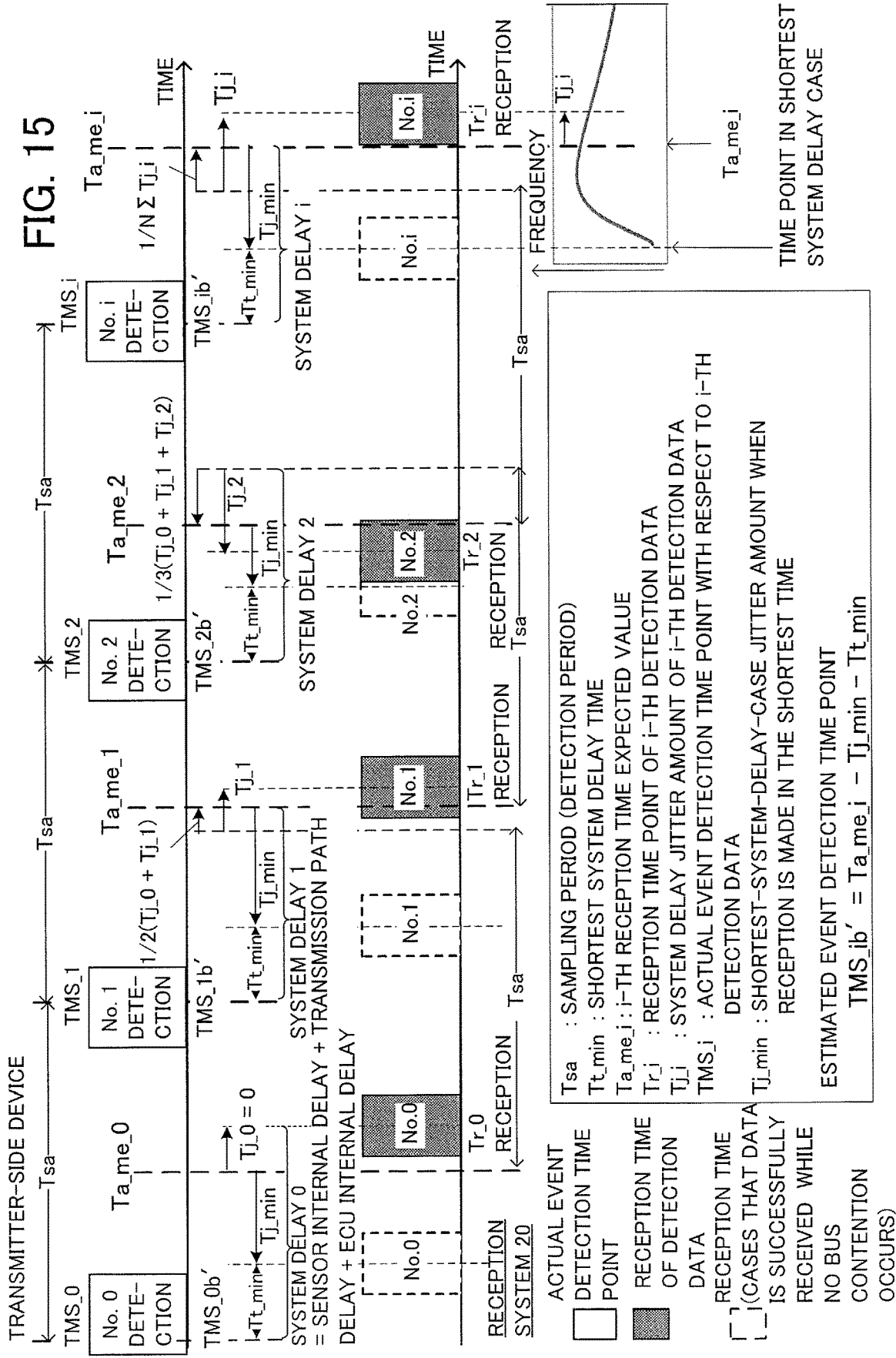
FIG. 15 is a timing chart showing the method of estimating an event detection time point by the receiver according to the second embodiment.

FIG. 15 is a timing chart showing a method of estimating the event detection time point TMS_ib' in the data reception unit 200 according to the second embodiment. In FIG. 15, parts that are the same as the parts shown in FIG. 4 are assigned the same reference signs. In FIG. 15, a time point when the sensor 170 detects an event (e.g., a position of an object) is denoted as 'TMS_i' (i=0, 1, 2, . . . ) and data produced at the time is denoted as 'No. i'. Then, after a lapse of internal delay time caused by internal processing in the sensor, the data is sent to the transmission path. After a lapse of transmission delay time, the detection data sent to the transmission path is received by the data reception unit 200 at a time point Tr_i (i=0, 1, 2, . . . ). In the data reception unit 200, the reception I/F unit 201 performs a reception process. Specifically, the reception I/F unit 201 reads out data stored in a reception buffer in the reception I/F unit 201 through a reception interruption process, and transfers the data to the association information addition unit 209. The reception I/F unit 201 concurrently sends a data reception notification to the reception-time-point measurement unit 202 to make an estimated event detection time point TMS_ib' that is estimated by an event-detection-time-point estimation unit 205 described later associated with the detection data in the association information addition unit 209 and to store the associated data.

The sensor 170 detects the event in every fixed sampling period Tsa and sends data as the result of the detection to the transmission path. If the system delay time is constant, timing of reception by the data reception unit 200 coincides with the fixed period Tsa, however, actually intervals between reception time points Tr_0, Tr_1, Tr_2, . . . , Tr_i when the data reception unit receives data do not have the fixed value Tsa but have different values as shown in FIG. 15.

In FIG. 15, 'Tt_min' denotes the value of the shortest time of the system delay (shortest system delay time) measured in advance. Receiving the detection data, the reception I/F unit 201 notifies the reception-time-point measurement unit 202 of a data reception notification. Every time when receiving the data reception notification, the reception-time-point measurement unit 202 acquires a current time point (reception time point) Tr_i from the system clock 160 and notifies the reception-time-point expected value calculation unit 203 of the current time point. Meanwhile, the shortest time of the system delay is measured in advance and the measured value is stored in the shortest system delay time storage unit 206. The sampling period storage unit 204 stores the event detection period that is an interval between object detections by the sensor 170, that is, the sampling period that is an interval between data outputs to the transmission path. The reception-time-point expected value calculation unit 203 calculates the reception-time-point expected value Ta_me_i from an average value (average system delay jitter amount) Tj_me_i of the arrival-time-point variation amount (system delay jitter amount) Tj_i with respect to the reception timing of regular intervals, in FIG. 15.

The reception-time-point expected value Ta_me_i is calculated by using the above equation (3), in the same way as in the first embodiment. The system delay jitter amount Tj_i calculated by using the above equation (2) is the amount of deviation from the reception-time-point expected value (Ta_me_i-1)+Tsa. 'Tj_min' denotes a system delay jitter amount when reception is made in the shortest time (shortest-system-delay-case jitter amount), that is, a maximum jitter amount in a direction that the reception time point becomes earlier than the reception-time-point expected value Ta_me_i. The jitter amount storage unit 210 monitors the jitter amount at the time of data reception estimated by the jitter amount estimation unit 207 and stores the maximum jitter amount in the direction that the reception time point becomes earlier. By using the above definition, the event-detection-time-point estimation unit 205 calculates the event detection time point TMS_ib' in the sensor 170 according to the above equation (7).

Specific operation by the reception unit 200 according to the second embodiment for estimating the event detection time point TMS_ib' in the sensor 170 described above will be described below. First, the reception-time-point expected value Ta_me_i is calculated by the reception-time-point expected value calculation unit 203. This process is the same as the process shown in the flowchart of FIG. 5 in the first embodiment.

Figure 16:
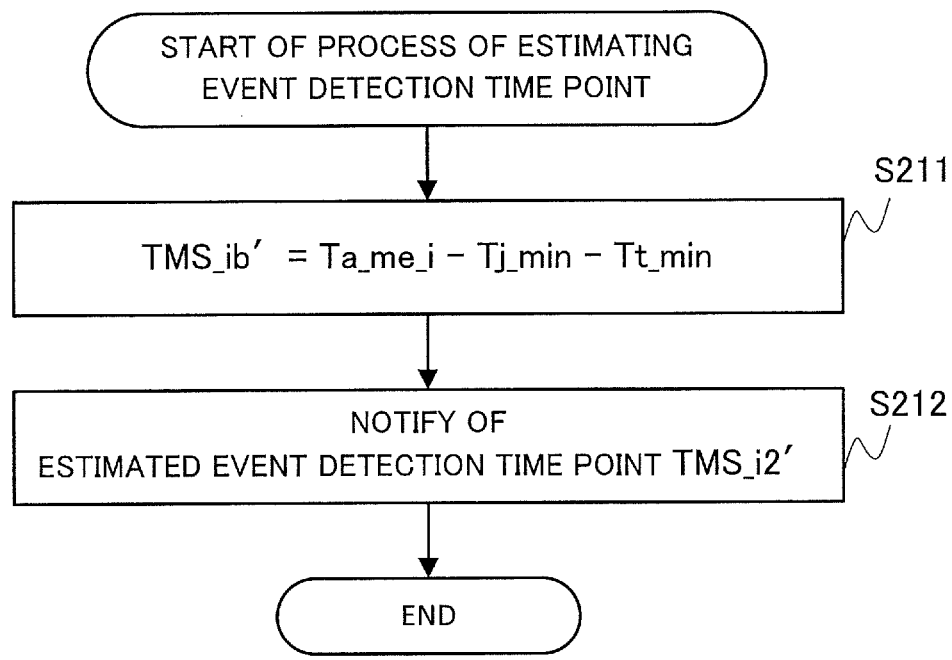
FIG. 16 is a flowchart showing a process of estimating an event detection time point by the receiver according to the second embodiment.

FIG. 16 is a flowchart showing a process of estimating the event detection time point TMS_ib' in the data reception unit 200 according to the second embodiment. The reception-time-point expected value calculation unit 203 notifies the event-detection-time-point estimation unit 205 of the reception-time-point expected value Ta_me_i, and then the event-detection-time-point estimation unit 205 performs a process of calculating the event detection time point TMS_ib' by using equation (7) in step S211. Then, in step S212, the event-detection-time-point estimation unit 205 notifies the association information addition unit 209 of the calculated event detection time point TMS_ib'.

Receiving the event detection time point TMS_ib' from the event-detection-time-point estimation unit 205, the association information addition unit 209 makes the event detection time point TMS_ib' associated with the detection data from the sensor 170 that has been already temporarily stored through the reception I/F unit 201, and the associated data is sent to the synthesizing processing unit 161.

(2-3) Advantageous Effect in Second Embodiment

Figure 17:
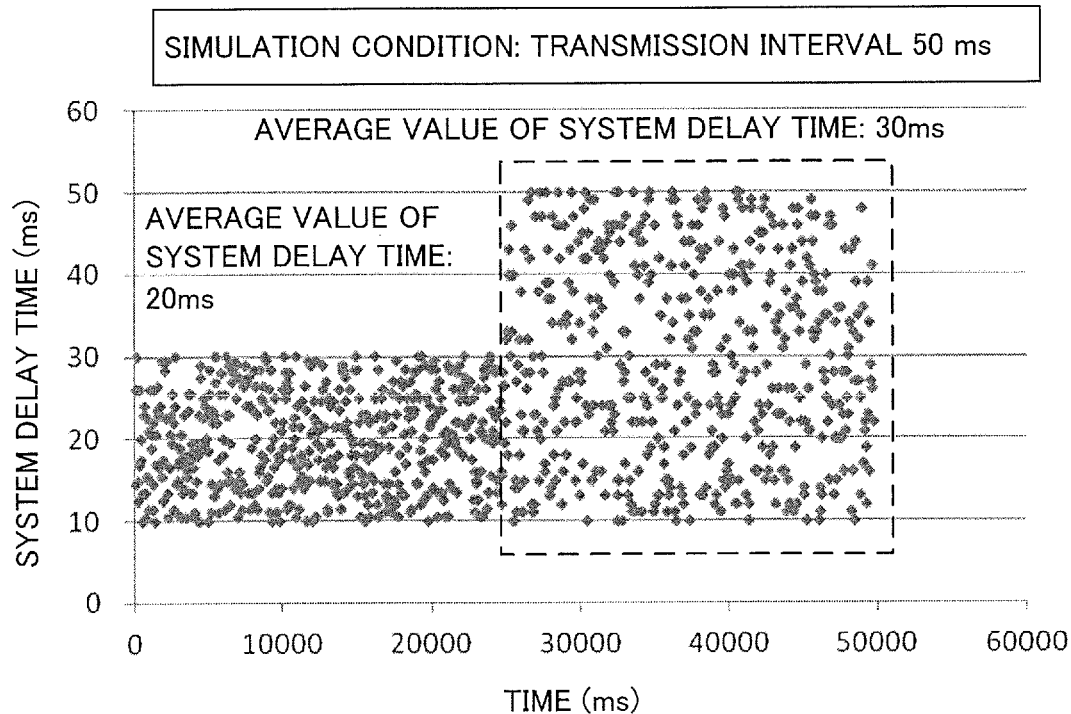
FIG. 17 is a diagram showing an example of a system delay distribution used for a simulation in FIG. 18.
Figure 18:
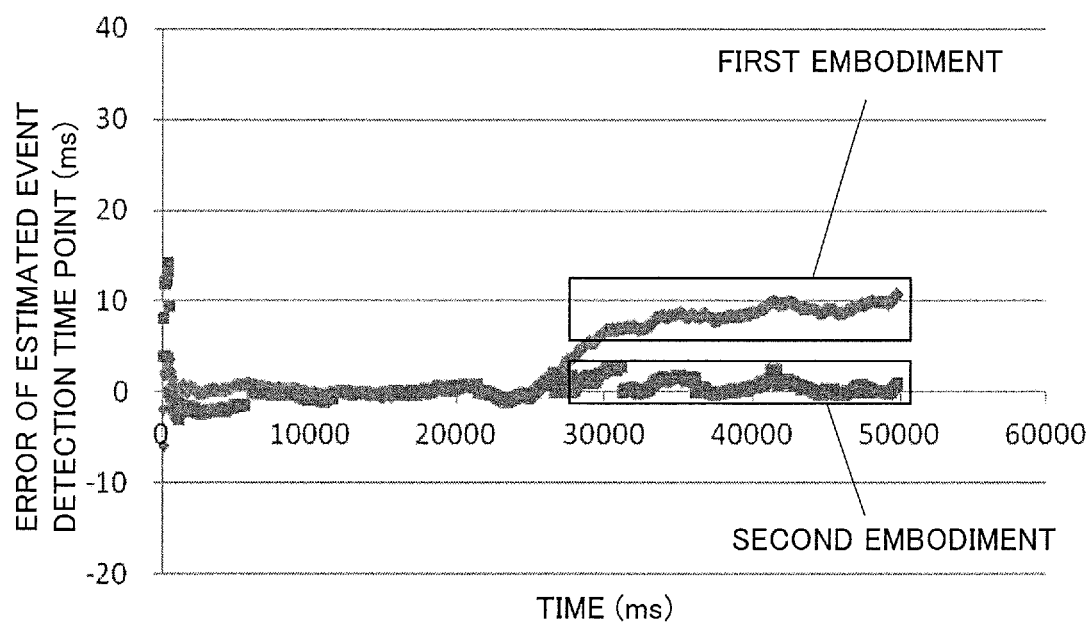
FIG. 18 is a diagram showing an example of estimation errors of event detection time points obtained through the simulations in the first embodiment and the second embodiment.

FIG. 17 is a diagram showing an example of a system delay distribution used for a simulation shown in FIG. 18. FIG. 18 is a diagram showing an example of estimation errors of event detection time points obtained through simulations of the first and second embodiments. FIG. 17 shows a case that the sampling period is set to 50 ms and the average value of the system delay time changes from 20 ms to 30 ms during the operation (time point 25000 ms). Accordingly, in the example of FIG. 17, the system delay is produced so that the jitter amount of the system delay time changes from ±10 ms to ±20 ms during the operation (time point 25000 ms). FIG. 18 shows a result of a simulation of errors of the event detection time points TMS_ib' estimated when the data reception unit 200 according to the second embodiment receives such data and errors of the event detection time points TMS_i' estimated when the data reception unit 100 in the first embodiment receives such data. As shown in FIG. 18, when the average value of the system delay time changes from 20 ms to 30 ms (at the time point 25000 ms), it is understood that the errors of the event detection time points in the first embodiment steadily occur within a range of approximately 0 ms from 10 ms. On the other hand, the errors of the event detection time points TMS_ib' in the second embodiment are not affected by the change in the system delay time, and it is understood that the estimation of time points can be performed with robustness to changes in circumstances.

As described above, the data reception unit (the event-detection-time-point estimation method) according to the second embodiment is capable of estimating the event detection time point TMS_ib' with high accuracy in the system in which the transmitter transmits data to the data reception unit, even if the system delay time contains jitter.

The data reception unit (the estimation method) according to the second embodiment eliminates the need to provide the sensor with the function of adding time information, and therefore improves system configuration flexibility.

Further, according to the second embodiment, in addition to the advantageous effect shown in the first embodiment, it is possible for the data reception unit 200 to estimate the event detection time point TMS_ib' with high accuracy in the system in which the transmitter transmits data to the data reception unit, even if the average system delay time changes. For example, if there is a device which stops transmission operation among the sensors connected to the transmission path, the average system delay time decreases. As another example, in a case that a sensor connected to the transmission path starts operating when it satisfies a certain condition (e.g., in a case that an infrared camera starts operating when the brightness in the surroundings decreases such as in the night and video data obtained through sensing by the camera is transmitted to a network at regular intervals), the frequency of occurrence of contention between the transmitter-side devices increases. In this case, since transmission of detection data from a lower-priority transmitter-side device is waited, the average system delay time on the transmission path increases, with respect to the detection data from the transmitter-side device. Even in such a case, by using the data reception unit according to the second embodiment, it is possible to estimate a time point when the sensor detects an event with high accuracy.

Vehicle detection information contained in traffic guide information distributed to a vehicle is so considerably old information that traffic condition far apart from the current condition is displayed as a display of traffic information, such as traffic-jam information. This problem can be solved by applying the data reception unit according to the second embodiment. Specifically, in a case that each of the sensors 170, 171 and 172 performs vehicle detection at regular intervals of Tsa and detected data is supplied to a traffic-guide-information production system as the reception system through a network as the transmission path, the shortest time taken for the transmission to the reception I/F unit 201 included in the data reception unit is measured in advance and the measured time is stored in the shortest-system-delay-time storage unit 206. The reception-time-point measurement unit 202 measures a reception time point Tr_i when the reception I/F unit 201 receives vehicle detection information. The reception-time-point expected value calculation unit 203 calculates a reception-time-point expected value Ta_me_i, through the processes shown in the flowchart of FIG. 5 based on equations (1), (2) and (3) from time points of past receptions and the value of the sampling period Tsa stored in the sampling period storage unit 204. The jitter amount storage unit 210 stores the maximum jitter amount that makes the reception time point earlier, of system delay jitter amounts Tj_i when data are received generated by the jitter amount estimation unit 207, as a jitter amount when the reception is made in the shortest time (shortest-system-delay-case jitter amount). By performing the process, shown in equation (7), of subtracting the shortest-system-delay-case jitter amount Tj_min and the shortest system delay time Tt_me measured in advance from the reception-time-point expected value Ta_me_i, that is, according to the flowchart of FIG. 16, it is possible for the event-detection-time-point estimation unit 205 to estimate an event detection time point (vehicle detection time point) accurately, to make the estimated vehicle detection time point with the vehicle detection information received by the association information addition unit 209, and to output the associated information to a processing unit in a following stage.

Furthermore, even if there are fluctuations as shown in FIG. 9 in the system delay time that is a time period after vehicle detection by the sensor until reception by the traffic-guide-information production system as the reception system, the data reception unit 200 according to the second embodiment makes it possible to reduce an error of an estimated event detection time point to be extremely small as shown in FIG. 10.

Moreover, even if the average value of the system delay time changes as in FIG. 17, the data reception unit 200 according to the second embodiment makes it possible to estimate with high accuracy without being affected by estimation of the event detection time point, as indicated by the result obtained through the method according to the second embodiment shown in FIG. 18.

As described above, according to the second embodiment, even if there is a change in the transmission delay time contained in the system delay time, it is possible to estimate an event detection time point accurately. Accordingly, it is possible to produce traffic guide information without including event detection information on the past before a certain threshold value.

Recently, various IOT (Internet of Things) services using various sensors connected to a network as a transmission path and using big data obtained through sensing by the sensors have been proposed, such as remote control operation of an object or the like at a distant location, an autonomous driving or driver-assistance system, detection of abnormal conditions of equipment or structure, prediction of abnormal conditions, generation and distribution of real-time traffic information by using data from sensors in vehicles or on roads, and watching or remote monitoring services for the elderly. Each of such services uses a system in which data are obtained through detection at regular intervals by sensors placed at distant locations and the obtained data are transmitted through a network. By applying the data reception unit according to the second embodiment to the system, it is possible to estimate a time point of sensing accurately, even in a case that random transmission-path delay jitter is undesirably contained on a transmission path and the transmission delay time changes to various values or the average transmission delay time changes. Therefore, it can be applied to various uses.

(3) Modification Example

Figure 19:
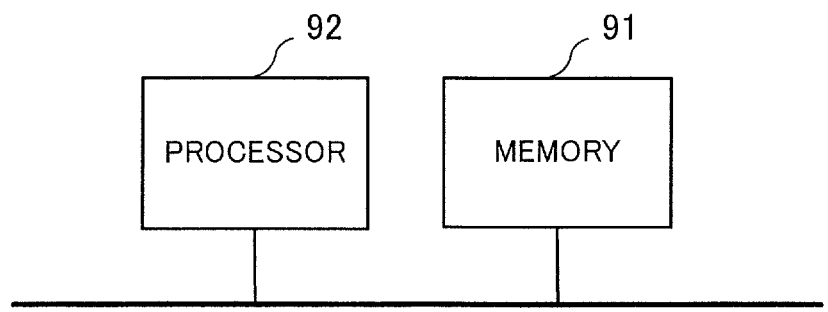
FIG. 19 is a hardware configuration diagram showing a receiver of a modification example of the first embodiment and the second embodiment.

FIG. 19 is a hardware configuration diagram showing a configuration of a modification example of the data reception units according to the first and second embodiments. The data reception units 100, 120 and 140 shown in FIG. 1 can be achieved by using a memory 91 as storage for storing a program as software and a processor 92 as an information processing unit for executing the program stored in the memory 91 (for example, by using a computer). In this case, the components 104, 106 and 109 in FIG. 1 correspond to the memory 91 in FIG. 19, and the components 101, 102, 103, 105, 107, 108 and 161 in FIG. 1 correspond to the processor 92 executing the program. Some of the components 101, 102, 103, 105, 107, 108 and 161 shown in FIG. 1 may be achieved by the memory 91 and the processor 92 executing the program that are shown in FIG. 19.

The data reception units 200, 220 and 240 shown in FIG. 13 can be achieved by using the memory 91 as storage for storing a program as software and the processor 92 as an information processing unit for executing the program stored in the memory 91 (for example, by using a computer). In this case, the components 204, 206, 209 and 210 in FIG. 13 correspond to the memory 91 in FIG. 19, and the components 201, 202, 203, 205, 207, 208 and 161 in FIG. 13 correspond to the processor 92 executing the program. Some of the components 201, 202, 203, 205, 207, 208 and 161 shown in FIG. 13 may be achieved by the memory 91 and the processor 92 for executing the program that are shown in FIG. 19.

DESCRIPTION OF REFERENCE CHARACTERS

10, 20 reception system; 100, 120, 140 data reception unit (receiver); 101 reception I/F unit (reception unit); 102 reception-time-point measurement unit; 103 reception-time-point expected value calculation unit; 104 sampling period storage unit; 105 event-detection-time-point estimation unit; 106 average-system-delay-time storage unit; 107 jitter amount estimation unit; 108 abnormal delay detection unit; 109 association information addition unit; 160 system clock; 161 synthesizing processing unit; 170, 171, 172 sensor; 200, 220, 240 data reception unit (receiver); 201 reception I/F unit (reception unit); 202 reception-time-point measurement unit; 203 reception-time-point expected value calculation unit; 204 sampling period storage unit; 205 event-detection-time-point estimation unit; 206 average-system-delay-time storage unit; 207 jitter amount estimation unit; 207*a* shortest-system-delay-case jitter amount estimation unit; 208 abnormal delay detection unit; 209 association information addition unit; 210 jitter amount storage unit; Tsa sampling period (detection period); Tr_i reception time; Tt_me average system delay time; Ta_me_i reception-time-point expected value; Tj_i system delay jitter amount; TMS_i', TMS_ib' estimated event detection time point; Tj_me_i average system delay jitter amount; Tj_min shortest-system-delay-case jitter amount; Tt_min shortest system delay time.

What is claimed is:

1. A receiver for receiving detection data sent from a sensor that detects an event in each fixed sampling period to estimate an event detection time point which is a time point when the sensor detects the event, the receiver configured to:
   receive the detection data;
   measure a reception time point which is a time point when the detection data is received by the reception unit;
   calculate a reception-time-point expected value, which is an expected value of a next reception time point at which detection data is subsequently received, from the reception time point and the sampling period;
   calculate a variation amount of the reception time point with respect to the reception-time-point expected value as a system delay jitter amount; and
   estimate the event detection time point, from a system delay time measured in advance as a time period from the time point when the sensor detects the event to the reception time point, the reception-time-point expected value and the system delay jitter amount, wherein the receiver is further configured to:
   calculate an average system delay jitter amount which is a distribution mean value of variation time components of the system delay time, and obtain the reception-time-point expected value by adding the sampling period and the average system delay jitter amount to an immediately preceding reception-time-point expected value calculated at a time of reception of immediately preceding detection data.

2. The receiver according to claim 1, wherein the event detection time point is calculated by subtracting, from the reception-time-point expected value, an average system delay time which is an average value of the system delay time.

3. The receiver according to claim 1 further configured to associate the event detection time point with the detection data.

4. The receiver according to claim 3, further configured to estimate the system delay jitter amount, from the reception time point and the reception-time-point expected value, and the system delay jitter amount with the detection data.

5. The receiver according to claim 3 further configured to detect that a system delay is abnormal when the system delay jitter amount exceeds a prescribed threshold value, and associate information indicating that the system delay is abnormal with the detection data.

6. An event-detection-time-point estimation method of estimating, in a receiver for receiving detection data sent from a sensor that detects an event in each fixed sampling period, an event detection time point which is a time point when the sensor detects the event, the method comprising:
   measuring a reception time point which is a time point when the detection data is received by the receiver;
   calculating a reception-time-point expected value which is an expected value of a next reception time point which is a time point when detection data is subsequently received, from the reception time point and the sampling period;
   calculating a variation amount of the reception time point with respect to the reception-time-point expected value, as a system delay jitter amount; and
   estimating the event detection time point, from a system delay time measured in advance as a time period from the time point when the sensor detects the event to the reception time point, the reception-time-point expected value and the system delay jitter amount, wherein calculating the reception-time-point expected value further includes:
      calculating an average system delay jitter amount which is a distribution mean value of variation time components of the system delay time; and
      obtaining the reception-time-point expected value, by adding the sampling period and the average system delay jitter amount to an immediately preceding, reception-time-point-expected value calculated at a time of reception of immediately preceding detection data.

7. The event-detection-time-point estimation method according to claim 6, wherein the event detection time point is calculated by subtracting, from the reception-time-point expected value, an average system delay time which is an average value of the system delay time.

8. A receiver for receiving detection data sent from a sensor that detects an event in each fixed sampling period to estimate an event detection time point which is a time point when the sensor detects the event, the receiver configured to:
   receive the detection data;
   measure a reception time point which is a time point when the detection data is received by the reception unit;
   calculate a reception-time-point expected value which is an expected value of a next reception time point which is a time point when detection data is subsequently received, from the reception time point and the sampling period;
   calculate a maximum value of a variation amount of the reception time point with respect to the reception-time-point expected value, as a shortest-system-delay-case jitter amount; and
   estimate the event detection time point, from a shortest system delay time obtained by measuring in advance a shortest time period from the time point when the sensor detects the event to the reception time point, the reception-time-point expected value and the shortest-system-delay-case jitter amount.

9. An event-detection-time-point estimation method of estimating, in a receiver for receiving detection data sent from a sensor that detects an event in each fixed sampling period, an event detection time point which is a time point when the sensor detects the event, the method comprising:
   measuring a reception time point which is a time point when the detection data is received by the receiver;
   calculating a reception-time-point expected value which is an expected value of a next reception time point which is a time point when detection data is subsequently received, from the reception time point and the sampling period;
   calculating a maximum value of a variation amount of the reception time point with respect to the reception-time-point expected value, as a shortest-system-delay-case jitter amount; and
   estimating the event detection time point, from a shortest system delay time obtained by measuring in advance a shortest time period from the time point when the sensor detects the event to the reception time point, the reception-time-point expected value and the shortest-system-delay-case jitter amount.

* * * * *